United States Patent
Qian et al.

(10) Patent No.: US 11,120,261 B2
(45) Date of Patent: Sep. 14, 2021

(54) IMAGING CONTROL METHOD AND DEVICE

(71) Applicant: SZ DJI TECHNOLOGY CO., LTD., Shenzhen (CN)

(72) Inventors: Jie Qian, Shenzhen (CN); Guanhua Su, Shenzhen (CN); Zhuo Guo, Shenzhen (CN); Guyue Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/690,668

(22) Filed: Nov. 21, 2019

(65) Prior Publication Data

US 2020/0104598 A1 Apr. 2, 2020

Related U.S. Application Data

(63) Continuation of application No. PCT/CN2017/085791, filed on May 24, 2017.

(51) Int. Cl.
*G06K 9/00* (2006.01)
*B64C 39/02* (2006.01)
*G05D 1/10* (2006.01)

(52) U.S. Cl.
CPC ........ *G06K 9/00637* (2013.01); *B64C 39/024* (2013.01); *G05D 1/101* (2013.01); *G06K 9/00671* (2013.01); *B64C 2201/145* (2013.01)

(58) Field of Classification Search
CPC .......... H04N 5/23203; B64C 2201/145; B64C 39/024; G05D 1/101; G06K 9/00671; G06K 2209/21; G06K 9/00637
See application file for complete search history.

(56) References Cited

U.S. PATENT DOCUMENTS

| | | | |
|---|---|---|---|
| 2011/0147515 A1* | 6/2011 | Miller ................... | B64C 39/028 244/63 |
| 2014/0192193 A1* | 7/2014 | Zufferey ................ | H04N 7/183 348/144 |

(Continued)

FOREIGN PATENT DOCUMENTS

| | | |
|---|---|---|
| CN | 105049812 A | 11/2015 |
| CN | 105353772 A | 2/2016 |

(Continued)

OTHER PUBLICATIONS

The World Intellectual Property Organization (WIPO) International Search Report for PCT/CN2017/085791 Feb. 12, 2018 8 pages.

*Primary Examiner* — Dakshesh D Parikh
(74) *Attorney, Agent, or Firm* — Anova Law Group, PLLC

(57) ABSTRACT

An imaging control method includes receiving a starting instruction including a flight mode of an unmanned aerial vehicle ("UAV"). The imaging control method also includes controlling the UAV to fly autonomously based on the flight mode. The imaging control method also includes obtaining, in the flight mode, location information of a target object, and obtaining orientation information of the target object relative to the UAV based on the target object recognized from an image captured by an imaging device carried by a gimbal mounted on the UAV. The imaging control method further includes controlling a flight path of the UAV based on the location information and the flight mode, controlling an attitude of the gimbal to render the target object to appear in the image, and controlling the imaging device to record a video in the flight mode, and to transmit video data to a terminal.

7 Claims, 18 Drawing Sheets

(56) References Cited

U.S. PATENT DOCUMENTS

| | | |
|---|---|---|
| 2014/0214239 A1 | 7/2014 | Bruck et al. |
| 2016/0004795 A1* | 1/2016 | Novak .................... G06F 30/20 |
| | | 703/1 |
| 2016/0229533 A1* | 8/2016 | van Cruyningen ..... B64C 13/18 |
| 2017/0038771 A1* | 2/2017 | Green ..................... G06F 3/165 |
| 2017/0192418 A1* | 7/2017 | Bethke ................. G08G 5/0034 |
| 2018/0204331 A1* | 7/2018 | Omari .................. G01S 13/878 |

FOREIGN PATENT DOCUMENTS

| | | | | |
|---|---|---|---|---|
| CN | 105487552 A | 4/2016 | | |
| CN | 105549614 A | 5/2016 | | |
| CN | 106598071 A | 4/2017 | | |
| CN | 106657779 A | 5/2017 | | |
| CN | 106657779 A | * 10/2017 | ......... | H04N 5/23203 |
| KR | 20170022872 A | 3/2017 | | |

* cited by examiner

Process the return video stream to a generate video footage of a first predetermined duration, the first predetermined duration being shorter than a duration of the return video stream — S901

FIG. 9

IMAGING CONTROL METHOD AND DEVICE

CROSS-REFERENCE TO RELATED APPLICATION

This application is a continuation application of International Application No. PCT/CN2017/085791, filed on May 24, 2017, the entire content of which is incorporated herein by reference.

TECHNICAL FIELD

The present disclosure relates to the technology field of image acquisition and, more particularly, to an imaging control method and device.

BACKGROUND

As the advancement of unmanned aerial vehicles ("UAV") aerial photography technologies, there are more and more types of UAVs on the market. The UAV aerial photography relates to a series of operations, such as camera settings, gimbal control, joystick control, and image composition and viewfinding. If a user desires to use the UAV to capture smooth videos with beautiful image composition, the user needs to set a series of parameters for the camera, gimbal, joystick, and image composition and viewfinding. The process of the control is relatively complex. It is difficult for a user who is not familiar with aerial photography operations to set satisfactory parameters in a short amount of time.

SUMMARY

In accordance with an aspect of the present disclosure, there is provided an imaging control method. The imaging control method includes receiving a starting instruction comprising a flight mode of an unmanned aerial vehicle ("UAV"). The imaging control method also includes controlling the UAV to fly autonomously based on the flight mode. The imaging control method also includes obtaining, in the flight mode, location information of a target object, and obtaining orientation information of the target object relative to the UAV based on the target object recognized from an image captured by an imaging device carried by a gimbal mounted on the UAV. The imaging control method also includes controlling a flight path of the UAV based on the location information and the flight mode. The imaging control method also includes controlling an attitude of the gimbal to render the target object to appear in the image captured by the imaging device. The imaging control method further includes controlling the imaging device to record a video in the flight mode, and to transmit video data to a terminal.

In accordance with another aspect of the present disclosure, there is also provided an imaging control device. The imaging control device includes a memory configured to store computer-executable instructions. The imaging control device also includes a processor configured to retrieve and execute the computer-executable instructions to perform a method including receiving a starting instruction comprising a flight mode of an unmanned aerial vehicle ("UAV"). The method also includes controlling the UAV to fly autonomously based on the flight mode. The method also includes obtaining, in the flight mode, location information of a target object, and obtaining orientation information of the target object relative to the UAV based on the target object recognized from an image captured by an imaging device carried by a gimbal mounted on the UAV. The method also includes controlling a flight path of the UAV based on the location information and the flight mode. The method also includes controlling an attitude of the gimbal to render the target object to appear in the image captured by the imaging device. The method further includes controlling the imaging device to record a video in the flight mode, and to transmit video data to a terminal.

In the present disclosure, by obtaining location point information determined based on angle data, a control command carrying imaging parameters may be generated based on the location point information. The control command may be transmitted to a target device, such that the target device may execute an imaging control process based on the imaging parameters, thereby improving the imaging efficiency and flexibility.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

FIG. 9 is a flow chart of an imaging control method at the smart terminal side, according to another example embodiment.

DETAILED DESCRIPTION OF THE EMBODIMENTS

Figure 1:
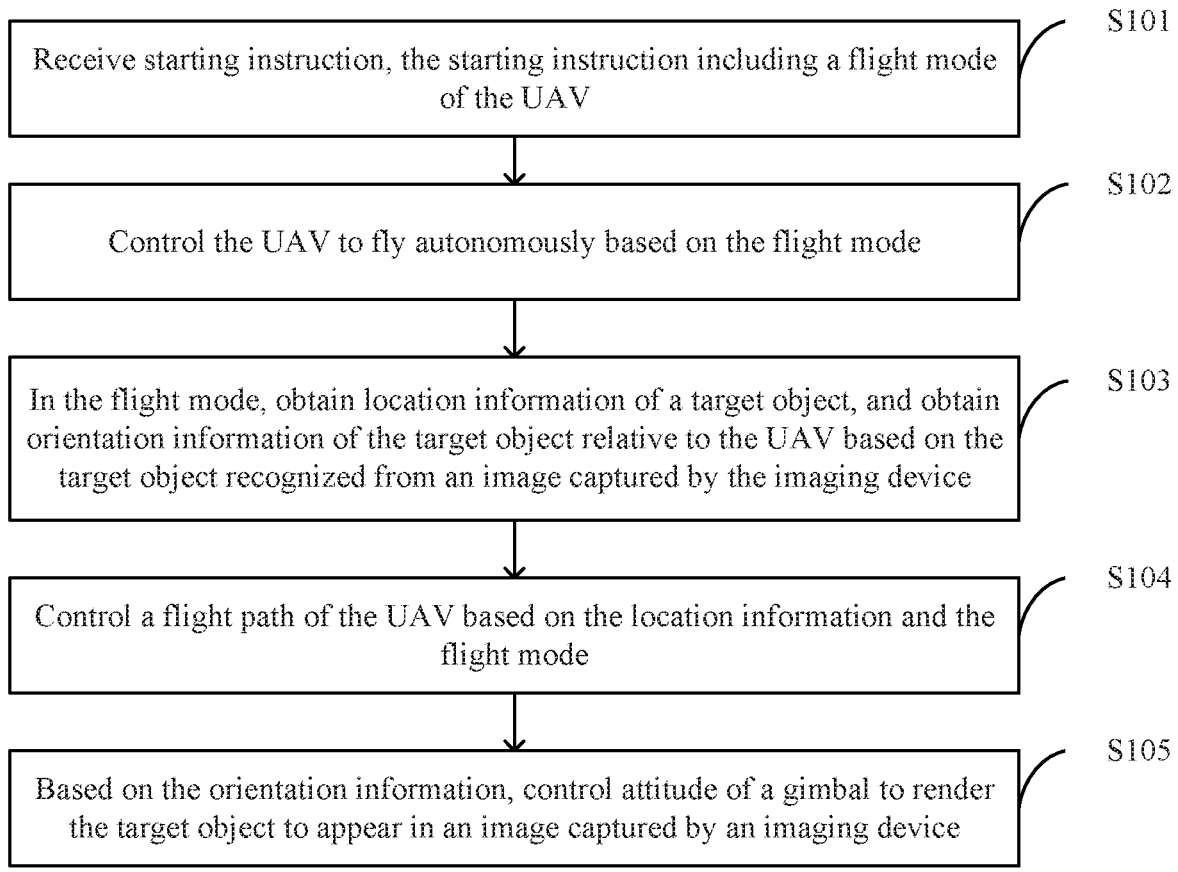
FIG. 1 is a flow chart illustrating an imaging control method at the UAV, according to an example embodiment.

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

In addition, the singular forms of "a," "an," and "the" are intended to include the plural forms as well, unless the context indicates otherwise. The terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

Next, the imaging control method and device of the present disclosure will be described in detail with reference to the drawings. When there is no conflict, the following embodiments and the features in the following embodiments may be combined.

The imaging control method and device may be used for controlling the aerial photography of the UAV or the imaging of other aerial photography devices, such as an unmanned vehicle having a gimbal, a movable robot, etc.

Using the UAV as an example, the UAV may include a carrier and a load. The carrier may enable the load to rotate around one, two, three or more axes. In some embodiments, the carrier may enable the load to move linearly along one, two, three, or more axes. The axes used for rotation or translation may be perpendicular to one another or may not be perpendicular to one another.

In some embodiments, the load may be rigidly carried by or connected to the UAV, such that the load may maintain a relative static state relative to the UAV. For example, the carrier connected to the UAV and the load may not allow the load to move relative to the UAV. In some embodiments, the load may be directly carried by the UAV and may not need any carrier.

In some embodiments, the load may include one or multiple sensors configured to monitor or track one or multiple target objects. The load may include image capturing devices or imaging devices (e.g., camera, camcorder, infrared imaging device, ultraviolet imaging device, or similar device), void capturing devices (e.g., parabolic reflective microphone), infrared imaging device, etc. any suitable sensor may be integrated to the load to capture visual signals, voice signals, electromagnetic signals, or any other expected signals. The sensor may provide a static sensing data (e.g., images) or dynamic sensing data (e.g., videos). The sensor may capture the sensing data in real time or continuously capture the sensing data at a high frequency.

In various embodiments, the target object tracked by the UAV may include any natural or man-made object or texture, such as geological scene (e.g., mountain, plant, valley, lake, river, etc.), buildings, transportation tools (e.g., airplanes, ships, cars, trucks, buses, cargo vans, or motorcycles). The target object may include a living body, such as a human or an animal. The target object may be moving or static relative to any suitable reference object. The reference object may be a relatively fixed reference object (e.g., the surrounding environment or the earth). In some embodiments, the reference object may be a moving reference object (e.g., a moving transportation tool). In various embodiments, the target object may include a passive target object or an active target object. The active target object may transmit information of the target object, such as the GPS location of the target object, to the UAV. The information may be transmitted in a wireless transmission manner from a communication unit of the active target object to a communication unit of the UAV. The active target object may be an environmentally friendly transportation tool, a building, an army, etc. the passive target object may not transmit the information of the target object. The passive target object may include a neutral or an enemy's transportation tool, building, army, etc.

The UAV may be configured to receive control data. The smart terminal 2 may be configured to provide the control data. The control data may be configured to directly or indirectly control various aspects of the UAV. In some embodiments, the control data may include a flight instruction for controlling the flight parameters of the UAV. The flight parameters may include a location, a velocity, a direction, or an attitude of the UAV. The control data may be configured to control the flight of the UAV. In some embodiments, the control data may include instructions for controlling a specific part of the UAV. For example, the control data may include information for controlling operations of a carrier. For example, the control data may be configured to control an actuation mechanism of the carrier to cause the load to perform angular movement or linear movement relative to the UAV. In other embodiments, the control data may be configured to control the movement of the carrier that does not carry a load. In other embodiments, the control data may be configured to adjust one or more operation parameters of the load, such as capturing a static or dynamic image, varying a focus of the lens, start/shutdown, switching imaging modes, changing imaging resolution, changing focus, changing depth of field, changing exposure time, changing lens speed, changing viewable angle or field of view, etc. In other embodiments, the control data may be configured to control the sensor system (not shown), the communication system (not shown), etc., of the UAV.

In some embodiments, the control data of the smart terminal 2 may include target object information. In some embodiments, the target object information may include a specified feature of the target object, such as an initial location (e.g., coordinates) and/or a size of the target object in one or more images captured by an imaging device carried by the UAV. Additionally or alternatively, the target object information may include information relating to the type of the target object, such as the type of the target object or features of classification, such as color, texture, style, size, shape, dimension, etc. The target object information may include data representing images of the target object, including images of the target object in a field of view. The field of view may be defined or formed by the images that the imaging device can capture.

The target object information may include expected target object information. The expected target object information may specify an expected feature that the tracked target object in the images captured by the imaging device should satisfy. The expected target object information may be configured for adjusting the UAV, the carrier, and/or the imaging device, such that the tracked target object maintains a same shape or pattern in one or more images based on the expected target object information. For example, the target object may be tracked such that the target object in the one or more images captured by the imaging device maintains an expected location or size. For example, the expected location of the tracked target object may be close to the center of the image or may be away from the center. For example, the expected size of the tracked target object may include an approximate amount (or quantity) of pixels. The expected target object information and the initial target object information may be the same or different. In various embodiments, the expected target object information may be provided by the smart terminal 2, or may not be provided by the smart terminal 2. For example, the expected target object information may be recorded in the form of hardcode in a logic circuit that is executed by a processing unit of the UAV, be stored locally in the UAV, and/or be stored in a remote data storage unit, or may be obtained from other suitable sources.

In some embodiments, at least a portion of the target object information (including specified target object information and the information of the type of the target object) may be generated based on use input through the smart terminal 2. Additionally or alternatively, the target object information may be generated based on other sources. For example, the information of the type of the target object may include previous images or data stored in a local or remote data storage unit. The images may be images previously captured by the imaging device carried by the UAV or other devices. The images may be computer generated. The information of the type of the target object may be user selected, or may be provided by the UAV by default.

The UAV may track one or multiple target objects based on the target object information. At least a portion of the tracking or other related data processing may be executed by one or multiple processors of the UAV. In some embodiments, the target object information may be used for recognizing a target object to be tracked by the UAV. The recognition of the target object may be executed based on initial target object information. The initial target object information may include a specified feature of a special target object (e.g., initial coordinates of the target object in an image captured by the UAV), or a common feature of a class of target objects (e.g., the color or texture of the target object to be tracked). In some embodiments, the recognition of the target object may include comparing two or more images to determine, extract, or match features of the two or more images.

When the target object is recognized, the expected target object information may be used to detect a deviation between the target object and the expected feature, such as a deviation in the expected location and/or size. In some embodiments, the current feature or information of the target object may be obtained through one or multiple images captured by the UAV. The current target object information may be compared with the expected target object information provided by the smart terminal 2 to determine a difference. The change in the location of the target object may be obtained through comparing the coordinates of the target object in the images (e.g., coordinates of the center point of the target object) and the expected coordinates of the location of the target object. The change in the size of the target object may be obtained through comparing a size of an area covered by the target object (e.g., pixels) with a predetermined size of the target object. In some embodiments, the change in size may be obtained through detecting a direction, a boundary, or other feature of the target object.

A control signal may be generated based on at least a portion of the deviation (e.g., through one or multiple processors of the UAV), and an adjustment to roughly correct the deviation may be executed based on the control signal. The adjustment may be used in the images captured by the UAV to roughly maintain one or multiple expected features of the target object (e.g., the location or size of the target object). In some embodiments, when the UAV execute a flight instruction (e.g., circling or moving instructions) provided by a user or a predetermined flight path, the adjustment may be performed in real time. When the imaging device captures one or multiple images, the adjustment may be performed in real time. In some embodiments, the adjustment may be performed based on other data, such as sensing data obtained by one or multiple sensors (e.g., a proximity sensor or GPS sensor) of the UAV. For example, location information of the tracked target object may be obtained through the proximity sensor, and/or be provided by the target object itself (e.g., GPS location). In addition to being used for detecting the deviation, the location information may also be used to execute the adjustment.

The adjustment may relate to the UAV, the carrier, and/or the load (e.g., the imaging device). For example, the adjustment may cause the UAV and/or the load (e.g., imaging device) to change location, attitude, direction, angular velocity or linear velocity, etc. the adjustment may cause the carrier to move the load (e.g., imaging device) around one, two, three or more axes relative to the UAV. Further, the adjustment may include adjusting the zoom, focus, or other operation parameters of the load (e.g., imaging device).

In some embodiments, at least a portion of the adjustment may be generated based on a type of the deviation. For example, the deviation relative to the expected location of the target object may entail the UAV and/or the load (e.g., through the carrier) to rotate around one, two, or three rotation axes. As another example, a deviation relative to the expected size of the target object may entail the UAV to translate along a suitable axis, and/or to change a focal distance of the imaging device (e.g., zoom in or zoom out of the lens). For example, if the current or actual size of the target object is smaller than the expected size of the target object, the UAV may need to move closer to the target object, and/or the imaging device may need to enlarge the target object. On the other hand, if the current or actual size of the target object is greater than the expected size of the target object, the UAV may need to move away from the target object, and/or the imaging device may need to shrink the target object.

In various embodiments, the adjustment that corrects the difference relative to the expected target object information may be realized through controlling one or multiple controllable objects based on the control signal. The controllable object may be a movable device, a carrier, an imaging device, or any combination thereof. In some embodiments, the controllable object may be selected to execute the adjustment. At least a portion of the control signal may be generated based on the configuration and setting of the controllable object. For example, if the imaging device is stably carried by the UAV and cannot move relative to the UAV, then rotating the UAV around two axes can realize the adjustment including rotation around the two corresponding axes. At this moment, the imaging device may be directly carried by the UAV, or the imaging device may be carried by the UAV through the carrier. The carrier may not allow relative movement between the imaging device and the UAV. If the carrier allows the imaging device to rotate around at least one axis relative to the UAV, the adjustment of the above two axes may be realized through a combination of an adjustment to the UAV and an adjustment to the carrier. In this situation, the carrier may be controlled to execute rotation around one or both of the two axes that are to be adjusted. In addition, the UAV may be controlled to execute the rotation around one or both of the two axes that are to be adjusted. For example, the carrier may be a one-axis gimbal, which may allow the imaging device to rotate around one of the two axes that are to be adjusted. The UAV may rotate around another one of the two axes that are to be adjusted. In some embodiments, the carrier may allow the imaging device to rotate around two or more axes relative to the UAV. Then the adjustment of the above two axes may be separately accomplished through the carrier. For example, the carrier may include a two-axis or a three-axis gimbal.

In other embodiments, the adjustment for correcting the size of the target object may be realized through controlling the zooming operation of the imaging device (if the imaging device can reach the desired zooming level), or through controlling the movement of the UAV (to be closer to or away from the target object), or a combination of the two methods. When executing the adjustment, the processor of the UAV may determine which method to select or determine to select the combination of the two methods. For example, if the imaging device is not configured to reach a zooming level that is needed to maintain the size of the target object in the images, the movement of the UAV may be controlled in place of or in addition to the zooming operation of the imaging device.

In some embodiments, the adjustment may consider other restraining conditions. For example, when the flight path of the UAV is predetermined, the adjustment may be executed through the carrier and/or the imaging device, and may not affect the movement of the UAV. For example, if a remote terminal is autonomously controlling the flight of the UAV through the smart terminal 2, or if the UAV is flying (autonomously or semi-autonomously) along a pre-stored flight path, the flight path of the UAV may be predetermined.

Other restraining conditions may include the maximum and/or minimum predetermined values, operation parameters, or others of the rotation angle, angular velocity, and/or linear velocity of the UAV, carrier, and/or load (e.g., imaging device). The maximum and/or minimum predetermined values may be used to display a range of adjustment. For example, an angular velocity of the UAV and/or imaging device around a specified axis may be limited by the maximum angular velocity of the UAV, carrier, and/or load (e.g., imaging device). As another example, the linear velocity of the UAV and/or carrier may be limited by the maximum linear velocity of the UAV, carrier, and/or load (e.g., imaging device). As a further example, the adjustment to the focal distance of the imaging device may be limited by the maximum and/or minimum focal distance of the specific imaging device. In some embodiments, the limits may be predetermined, or may be based on special configurations of the UAV, carrier, and/or load (e.g., imaging device). In some embodiments, the configurations may be adjustable (e.g., through manufacturer, administrator, or user).

In some embodiments, the UAV may be configured to provide data, and the smart terminal 2 may be configured to receive data, such as the sensing data obtained by the sensors of the UAV. The smart terminal 2 may also be configured to indicate tracking data or information of a feature of one or multiple target objects tracked by the UAV. The sensing data may include image data captured by the imaging device carried by the UAV, or data sensed by other sensors. For example, video streams from the UAV and/or the load (e.g., imaging device) may be transmitted to the smart terminal 2 in real time or in near real time. The sensing data may also include data obtained by a GPS sensor, a motion sensor, an inertial measurement unit ("IMU") sensor, a proximity sensor, or other sensors. The tracking data may include relative or absolute coordinates or size of the target object in the image frames received by the UAV, changes of the target object in continuous image frames, GPS coordinates, or other location information of the target object. In some embodiments, the smart terminal 2 may display the tracked target object using the tracking data (e.g., through a graphical tracking indicator, such as a rectangular or square frame surrounding the periphery of the target object). In various embodiments, the data received by the smart terminal 2 may be unprocessed data (e.g., unprocessed sensing data obtained by various sensors) and/or processed data (e.g., tracking data processed by the one or multiple processors of the UAV).

In some embodiments, the location of the smart terminal 2 may be far away from the UAV, the carrier, and/or the load. The smart terminal 2 may be placed or glued to a supporting platform. Alternatively, the smart terminal 2 may be a handheld or wearable device. For example, the smart terminal 2 may include a smart phone, a tablet, a laptop, a computer, glasses, a glove, a helmet, a microphone, or any suitable combination thereof.

The smart terminal 2 may be configured to display, through a display device, display data received from the UAV. The display data may include the sensing data, such as the images obtained by the imaging device carried by the UAV. The display data may include the tracking information. The tracking information and the image data may be separately displayed or the tracking information may be superimposed on top of the image data. For example, the display device may be configured to display images, with the target object in the images being indicated by the tracking indicator or displayed with highlight. In some embodiments, the tracking indicator may be a rectangular or square frame, a circle, or other geometric shape surrounding the tracked target object. In some embodiments, when the images and tracking data are received from the UAV, and/or when the image data are obtained, the images and the tracking indicator may be displayed in real time. In some embodiments, the display may be delayed.

The smart terminal 2 may be configured to receive an input of a user through an input device. The input device may include a joystick, a keyboard, a mouse, a stylus, a microphone, an image or motion sensor, an IMU, etc. Any suitable user input may interact with the terminal, for example, manual input of instructions, voice control, gesture control, or location control (e.g., through motion, location, or tilting of the terminal). For example, the smart terminal 2 may be configured to allow the user to operate the joystick to change a direction or attitude of the smart terminal 2, use a keyboard, a mouse, a finger, or a stylus to interact with a user graphical interface, or use other methods to control the UAV, the carrier, or the load, or any combination thereof.

The smart terminal 2 may be configured to allow a user to input the target object information through any suitable method. In some embodiments, the smart terminal 2 may enable a user to directly select a target object from one or multiple displayed images (e.g., a video or a snapshot). For example, the user may use a finger to directly touch a screen to select the target object, or use the mouse or the joystick to select the target object. The user may draw a line to surround the target object, touch the target object on the image, or select the target object on the image. Computer vision or other techniques may be used to recognize the boundary of the target object. One or multiple target objects may be selected at one time. In some embodiments, the selected target object may be displayed through a selection indicator to indicate that the user has selected the desired target object to track. In some embodiments, the smart terminal 2 may enable the user to select or input the target object information, such as color, texture, shape, dimension, or other desirable features of the target object. For example, the user may input information of the type of the target object, select such information through the graphical user interface, or use other methods. In some embodiments, the target object information may be obtained from some data sources rather than from the user. The data sources may include a remote or local data storage unit, other computing devices connected or communicating with the smart terminal 2, etc.

In some embodiments, the smart terminal 2 may enable the user to select between a manual tracking mode and an automatic tracking mode. When the manual tracking mode is selected, the user may specify a specific target object for tracking. For example, the user may manually select the target object from the image displayed by the smart terminal 2. Specific target object information (e.g., coordinates or size) of the selected target object may be transmitted to the UAV as the initial target object information of the target object. On the other hand, when the automatic tracking mode is selected, the user may not specify the specific target object to be tracked. The user may, for example, specify descriptive information regarding the type of the target object to be tracked through the user interface provided by the smart terminal 2. The UAV may automatically recognize the image to be tracked based on the initial target object information of the specific target object or the descriptive information of the type of the target object, and may track the recognized image.

In general, providing specific target object information (e.g., the initial target object information) involves more user control in target object tracking and less automatic processing or computing (e.g., recognition of image or target object). The automatic processing or computing may be executed by a processing system provided on the UAV. On the other hand, providing the descriptive information of the type of the target object involves less user control in the tracking of the target object, but more computing executed by the processing system provided on the UAV. An assignment between the user control and the processing system control during a tracking process may be adjusted based on various factors, such as the environment of the UAV, the velocity or attitude of the UAV, user preference, a computing capability internal to or external to the UAV (e.g., CPU or memory), etc. for example, when the UAV flies in a relatively complex environment (e.g., there are many buildings, obstacles, or indoor), more user control may be assigned as compared to the UAV flying in a relatively simple environment (e.g., an open space or outdoor). In some embodiments, when the UAV flies at a relatively low sea level location, more user control may be assigned as compared to flying at a high sea level location. In some embodiments, when the UAV is provided with a high speed processor that can execute complex computation at a faster speed, more automatic control may be assigned to the UAV. In some embodiments, the assignment between the user control and the UAV automatic control during the tracking process may be dynamically adjusted based on the above-described factors.

The control data may be generated based on at least a portion of the user input. The control data may be generated by the smart terminal 2, the UAV, a third device, or any combination thereof. For example, the user operation of the joystick or the smart terminal 2, or the interaction with the graphical user interface may be converted into predetermined control instructions, to change the state or parameters of the UAV, the carrier, or the load. In another embodiment, the user selection of the target object in the image displayed by the terminal may generate the initial target object information and/or the expected target object information to be tracked, such as the initial and/or expected location and/or size of the target object. Alternatively or additionally, the control data may be generated based on information that is not user operation, such as a remote or local data storage unit, or another computing device connected with the smart terminal 2, etc.

In some embodiments, the UAV may carry a gimbal. The gimbal may carry an imaging device. By controlling a rotation angle of the gimbal around one or multiple rotation axes, the UAV may be enabled to continuously capture images of the target object during a process of the UAV moving toward a location or in a direction. The image including the target object that is captured by the imaging device may be transmitted to a ground terminal device through a wireless link. For example, the image including the target object that is captured by the UAV may be transmitted through a wireless link to the smart terminal 2, such as a smart phone, a tablet, etc. These smart terminals 2 may have established the communication link with the UAV or directly with the imaging device prior to receiving the image including the target object.

The target object may be an object specified by the user, such as an environmental object. The image captured by the imaging device may be displayed in a user interface. The user may select an object as the target object by clicking operations on the image displayed in the user interface. For example, the user may select a tree, an animal, or an object in a region as the target object. In some embodiments, the user may only input image features of certain objects, such as, inputting a feature of a human face, an appearance feature of a certain type of objects. A corresponding processing module 204 may process the images to find a human or an object corresponding to the image features. The found human or object may be used as the target object for imaging.

In some embodiments, the target object may be a static object, or may not move within a time period of continuous imaging, or the moving velocity of the target object in the continuous imaging process is much smaller than the moving velocity of the UAV, or the velocity difference between the two is smaller than a predetermined value.

In some embodiments, to better realize continuous imaging from multiple angles, the gimbal may be a three-axis gimbal. The gimbal may rotate around three rotation axes: a yaw axis, a pitch axis, and a roll axis. In some embodiments, the gimbal may be a two-axis gimbal. The gimbal may rotate around two axes: the pitch axis and the roll axis. The gimbal may include two degrees of freedom: the pitch angle and the roll angle. To control the attitude of the two-axis gimbal in the yaw direction, attitude change of the two-axis gimbal in the yaw direction may be realized by controlling the yaw direction of the UAV. That is, the gimbal may include another degree of freedom, i.e., the yaw angle of the UAV.

The imaging device may be a device having an imaging acquisition capability, such as a camera or an image sensor.

The imaging control method and device of the present disclosure will be described below using the imaging control method and device being implemented to control the aerial photography of the UAV as an example.

In one embodiment, the present disclosure provides an imaging control method. The method may be implemented at a UAV 1. In this embodiment, at the UAV 1, the method may be realized by a dedicated control device, or may be realized by a flight controller of the UAV, or may be realized by a gimbal controller.

Referring to FIG. 1, the imaging control method may include the following steps:

Step S101: receiving a starting instruction, the starting instruction including a flight mode of the UAV.

In this embodiment, the starting instruction may be transmitted to the UAV 1 by the smart terminal 2. The smart terminal 2 may include a user interface. In some embodiments, the user interface may be provided with an operation button for generating the starting instruction. The operation button may be a physical button or a virtual button. In some embodiments, when the user is to control the UAV to autonomously fly, the user may press the operation button. This method provides a convenient and fast control of the UAV to autonomously fly, and does not require the user to operate the joystick to control the flight of the UAV.

In some embodiments, the flight mode may include at least one of the following: a slant line mode, a circling mode, a spiral mode, a roaring mode, or a comet circling mode. Each flight mode may include a corresponding flight strategy (the flight strategy corresponding to each flight mode will be described in detail in the following step S104). The flight strategy may be configured to instruct the flight of the UAV, thereby realizing a function of one-button control of the UAV to fly based on the desired flight strategy. This method of controlling the flight of the UAV is more precise, convenient, and does not need to rely on complex joystick controls to realize the flight of the UAV. In some embodiments, the flight mode may also include other flight modes, such as a straight line flight mode.

In some embodiments, the flight mode may be a default flight mode. The default flight mode may be a predetermined flight mode or a combination of multiple predetermined flight modes. In some embodiments, after the user presses the operation button for generating the starting instruction, the smart terminal 2 may select the default flight mode and generate the starting instruction based on the default flight mode.

In some embodiments, the flight mode may be a flight mode input by the user. In some embodiments, the user may select the flight mode of the UAV based on actual need. In some embodiments, the smart terminal 2 may be preconfigured with multiple flight modes for the user to select. The user may select one or more of the multiple selectable flight modes provided by the smart terminal 2 based on actual need, thereby instructing the UAV to realize flights under different flight modes to obtain images from different field of views.

In some embodiments, each flight mode may include at least one of a corresponding flight distance and a flight velocity, thereby instructing the UAV to automatically accomplish flight under each flight mode based on the flight distance and/or flight velocity. In some embodiments, the flight distance and the flight velocity corresponding to each flight mode may be determined based on actual needs, thereby satisfying diverse demands from the users.

Step S102: controlling the UAV to fly autonomously based on the flight mode;

In this embodiment, step S102 may be executed after step S101 is executed, thereby realizing automatic control of the UAV to accomplish a relatively complex flight path. In some embodiments, the UAV may autonomously fly based on the flight strategy of the flight mode.

In this embodiment, the method may also include: controlling the imaging device to record videos in the flight mode, and to transmit video data to the smart terminal 2, thereby obtaining the video data captured in the aerial photography by the UAV. In some embodiments, in each flight mode, the UAV may store in real time the current video data captured by the imaging device (i.e., the raw data stream) and may compress the raw data stream in real time. The UAV may generate a return video stream and transmit it to the smart terminal 2, such that the smart terminal 2 may display in real time the images currently captured by the UAV.

Step S103: in the flight mode, obtaining location information of a target object, and obtaining orientation information of the target object relative to the UAV based on the target object recognized from an image captured by the imaging device.

In some embodiments, the location information of the target object refers to absolution location information of the target object, for example, coordinates of the target object in the North East Down coordinate system. The orientation information of the target object relative to the UAV refers to the direction of the target object relative to the UAV. In some embodiments, the direction information may not include distance information between the target object and the UAV.

Figure 2A:
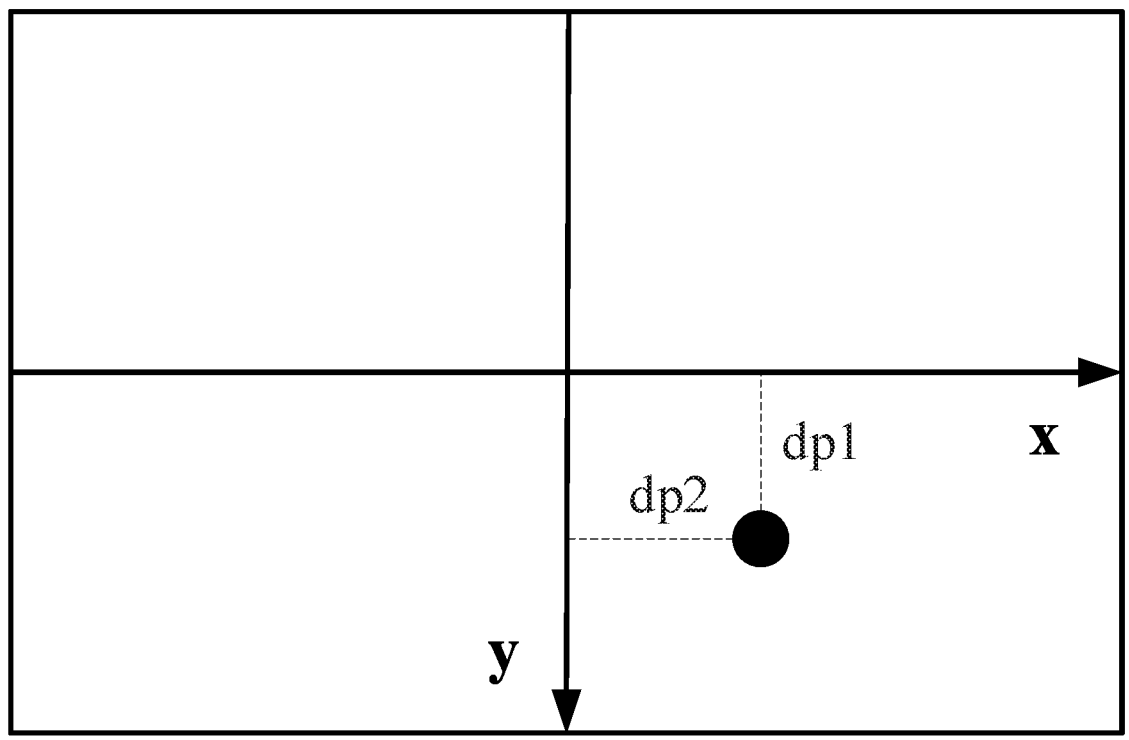
FIG. 2a is a schematic illustration of an image coordinate system and a field of view, according to an example embodiment.
Figure 4:
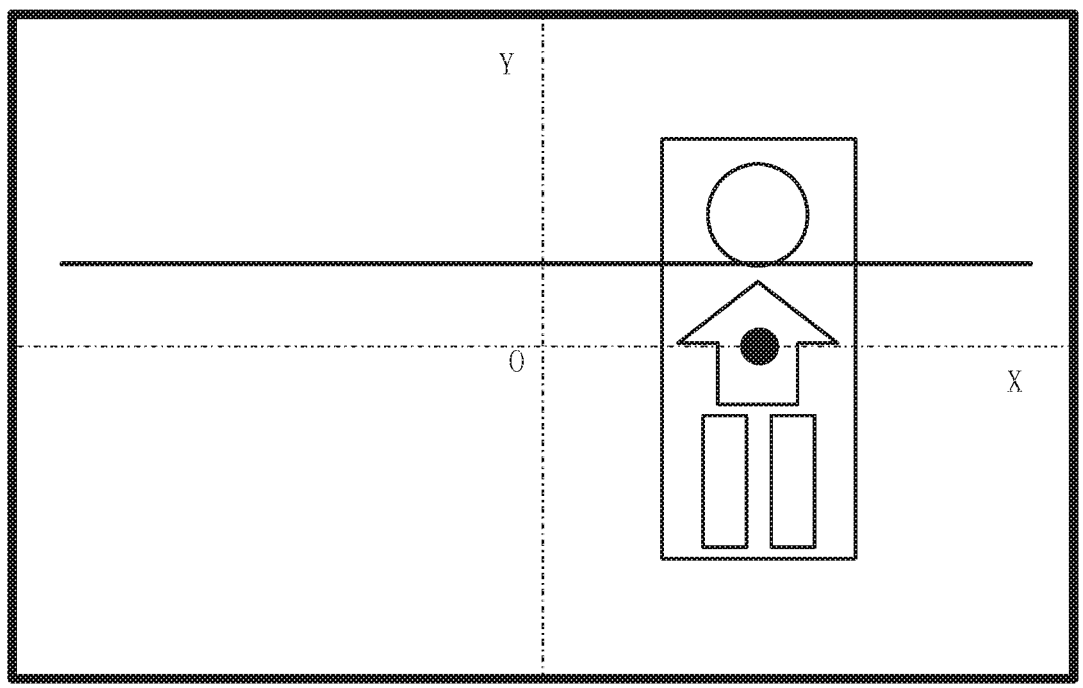
FIG. 4 is a schematic illustration of an image composition, according to an example embodiment.
Figure 5:
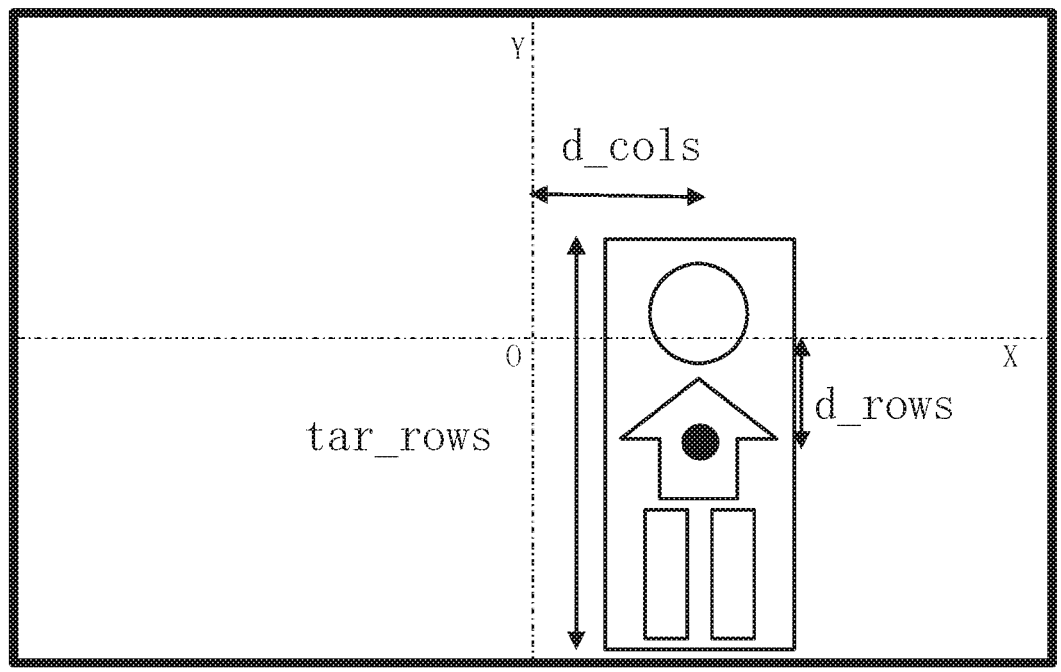
FIG. 5 is a schematic illustration of an image composition, according to another example embodiment.

In this embodiment, combining FIG. 2*a*, FIG. 4, and FIG. 5, a physical coordinate system of an image captured by the imaging device may be set as XOY. The origin of the physical coordinate system may be an optical axis location of the imaging device. The physical coordinate system XOY may include an X axis and a Y axis. The X axis may correspond to the yaw direction of the gimbal. The Y axis may correspond to the pitch direction of the gimbal.

In some embodiments, obtaining the location information of the target object may include the following steps: obtaining an information set including at least two groups of imaging information, and determining the location information of the target object based on at least two groups of imaging information selected from the information set. In some embodiments, locations corresponding to imaging location information included in each selected group of imaging information may be different. The imaging information may include imaging location information and imaging angle information when the target object is imaged.

In one embodiment of the present disclosure, after determining the target object in the captured image, during the process of UAV moving while imaging, analysis and recognition may be performed on the image based on image recognition technologies. Specifically, image recognition may be performed on each captured image based on features such as grayscale, texture, etc., to obtain a target object and to continuously image the target object.

During the process of continuously imaging the target object, a situation of losing the target object may occur. Multiple reasons may contribute to the loss of the target object. Specifically, when the target object is blocked by another object, the target object may not be find based on image recognition using features such as the grayscale, texture, etc., which may result in the loss of the target object. Alternatively, if the distance to the target object is relatively far away after the UAV moves, the features of the target object in the captured image such as the grayscale, texture, etc., may be insufficient for recognizing the target object from the image, which may result in the loss of the target object. Of course, other situations in which the target object is lost may also occur. For example, when the lens of the imaging device is subject to illumination of a strong light, the features such as the grayscale, texture, etc., in the captured image may become very weak. In some embodiments, the module configured to perform image recognition processing may malfunction. It should be noted that the loss of the target object described above means that the target object cannot be determined in the image.

In some embodiments, when detecting that the image including the target object satisfies a predetermined condition, imaging information when capturing the image that satisfies the predetermined condition may be recorded. Specifically, the image including the target object satisfying the predetermined condition may include: for an image captured at a certain time, the target object can be accurately recognized from the image based on image recognition technologies. The imaging information recorded when the image is captured may include: the imaging location information and the imaging angle information. The imaging location information may be configured to indicate location information of the imaging device when the imaging device captures the target object. The imaging location information may be the positioning information of the UAV, such as the GPS coordinates. The imaging angle information of the present disclosure may be configured to indicate the orientation of the target object relative to the imaging device when the imaging device captures the target object. The orientation may be determined based on a combination of an attitude angle of a gimbal (e.g., the yaw angle and/or the pitch angle of the gimbal) and the display location of the target object in the captured image.

During the movement of the UAV, the present disclosure may detect at least two images that satisfy the predetermined condition, and may record the corresponding imaging information. The recorded imaging information may form an information set, which makes it convenient to calculate the location information of the target object based on the imaging information, such that when the target object is lost, or when it is needed to image the object directly based on the location, the user demand for continuous imaging may be satisfied in a certain degree. In some embodiments, locations corresponding to the imaging location information included in each group of imaging information of the information set may be different.

Figure 2B:
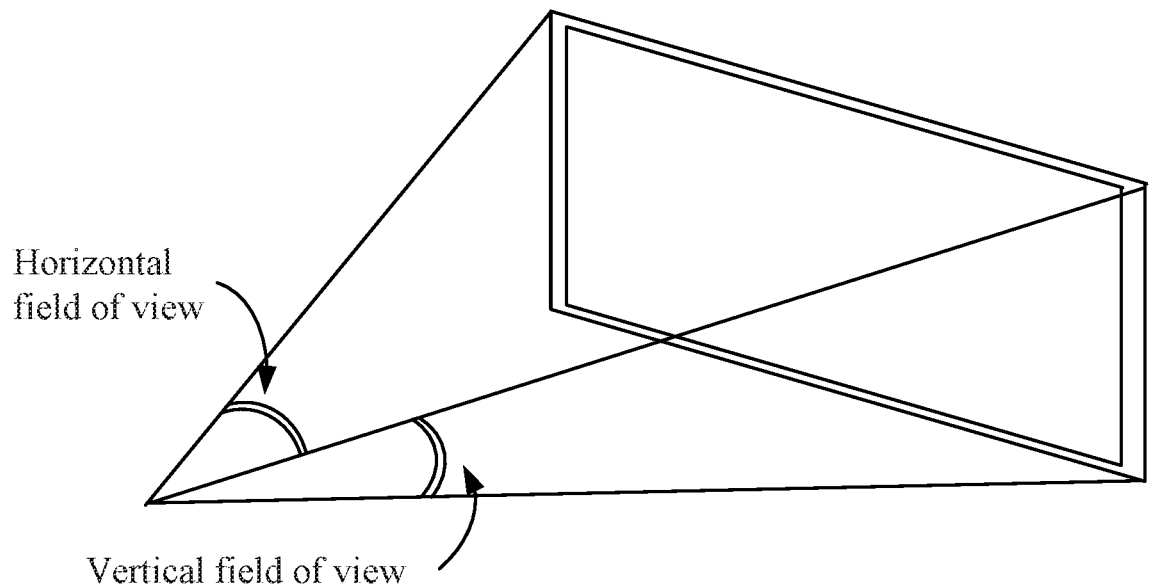
FIG. 2b is a schematic illustration of a field of view of an imaging device, according to an example embodiment.
Figure 6A:
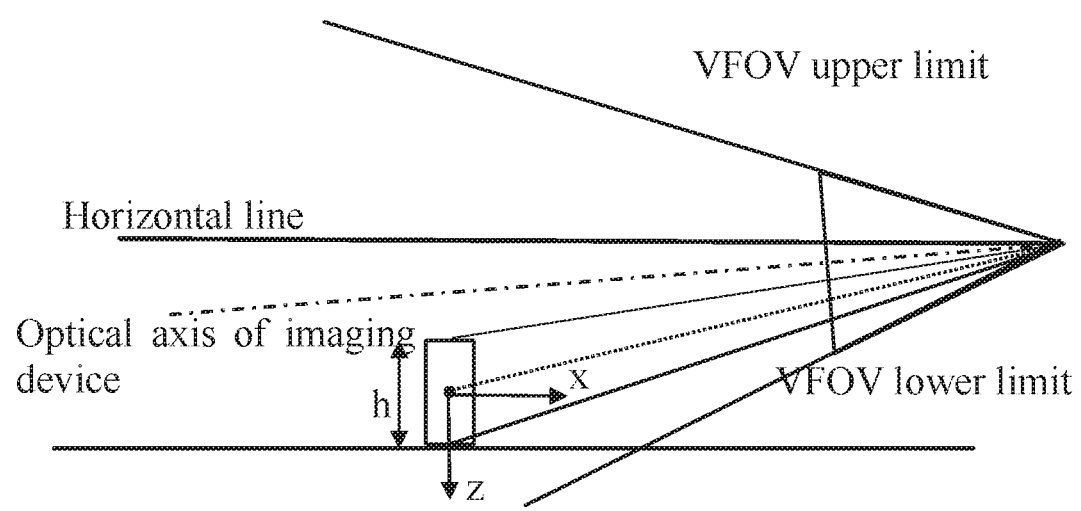
FIG. 6a is a schematic illustration of location relationship between the imaging scene and the imaging device, according to an example embodiment.
Figure 6B:
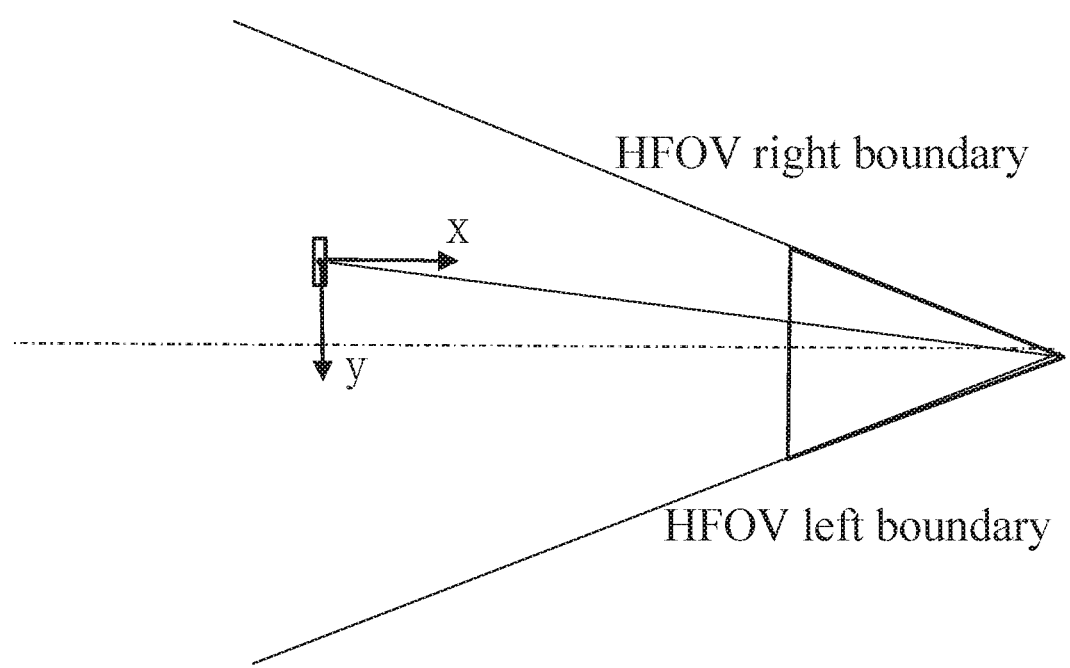
FIG. 6b is a schematic illustration of location relationship between the imaging scene and the imaging device, according to another example embodiment.
Figure 6C:
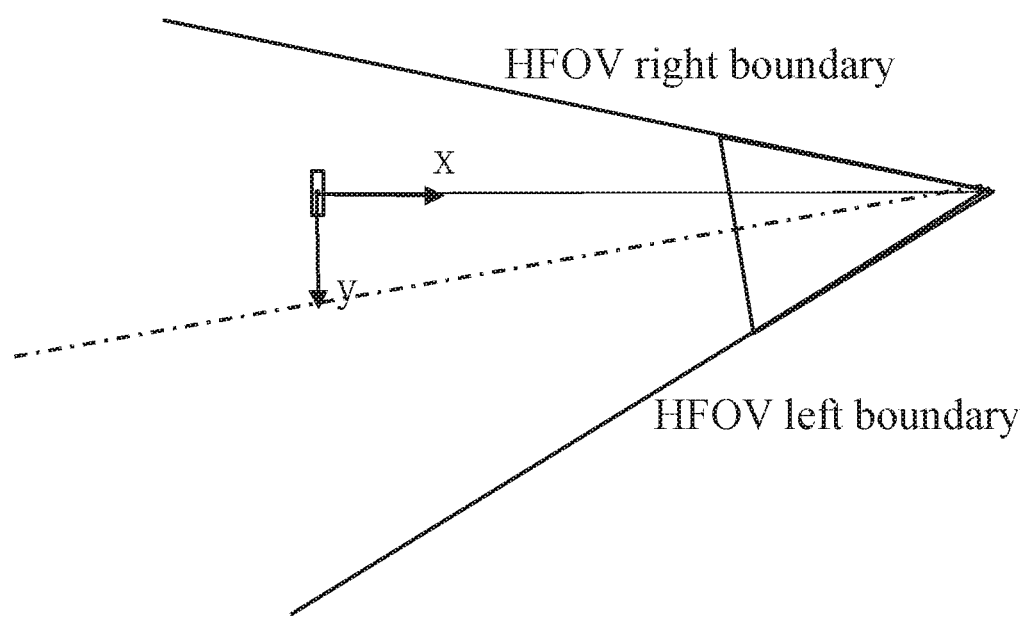
FIG. 6c is a schematic illustration of location relationship between the imaging scene and the imaging device, according to another example embodiment.

In some embodiments, the imaging location information may include acquired location coordinates of the UAV. The imaging angle information may include an angle calculated based on the attitude information of the gimbal and the location information of the target object in the captured image. In some embodiments, with respect to the imaging angle information, if the target object is located at a center region of the captured image when the target object is captured, then the pitch angle of the imaging angle information may be a pitch angle of the gimbal, and the yaw angle of the imaging angle information may be the yaw angle of the gimbal. Referring to FIG. 2a and FIG. 2b, if the target object is not at the center region of the captured image, a deviation angle of the target object relative to an X axis of the image may be determined based on a pixel distance dp1 (i.e., d_rows in FIG. 5) of a center point of the target object relative to the X axis of the image physical coordinate system and a value of a horizontal field of view. In addition, a deviation angle of the target object relative to a Y axis of the image may be based on a pixel distance dp2 (i.e., d_cols in FIG. 5) of the center point of the target object relative to the Y axis of the image physical coordinate system and a value of a vertical field of view. The pitch angle in the imaging angle information may be a sum of the pitch angle of the gimbal and the deviation angle relative to the X axis of the image. The yaw angle in the imaging angle information may be a sum of the yaw angle of the gimbal and the deviation angle relative to the Y axis of the image. Specifically, FIG. 2a and FIG. 2b show the image physical coordinate system, the horizontal field of view ("HFOV") and the vertical field of view ("VFOV") of the imaging device. The deviation angle relative to the X axis of the image and the deviation angle relative to the Y axis of the image may be obtained based on a pixel distance ratio between the pixel distances of the center point of the target object relative to the X axis and the Y axis and the corresponding field of view. In addition, combining FIG. 6a, FIG. 6b, and FIG. 6c, which shows the location relationship between the imaging device and the imaging scene, the relationship between the target object and the field of view ("FOV") of the imaging device may be learned by a person having ordinary skills in the art.

After the information set is obtained, when it is needed to realize the control of the flight path of the UAV based on the location, such as when the target object cannot be recognized by image recognition, or when a condition for continuously controlling the flight path of the UAV based on the location is satisfied, at least two groups of imaging information may be selected from the information set. Selection rules for selecting at least two groups of imaging information from the information set may include: selecting imaging information based on a separation distance calculated based on the imaging location information in the imaging information; and/or selecting the imaging information based on a separation angle calculated based on the imaging angle information in the imaging information. Satisfying the condition for continuous imaging based on the location may include: receiving a control instruction from a user for continuous imaging based on the location, or location coordinates of the target object can be relatively accurately calculated based on information of the information set that is already recorded.

Figure 3:
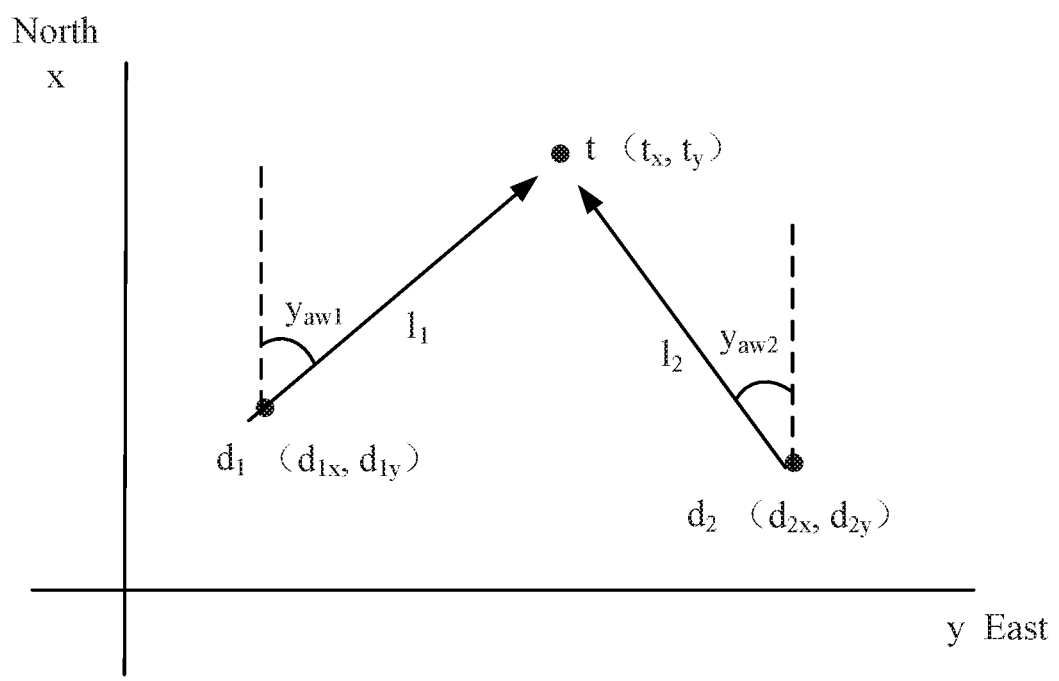
FIG. 3 is a schematic illustration of allocation coordinates between the UAV and a target object, according to an example embodiment.

The present embodiment uses selecting two groups of imaging information as an example to describe the calculation of the location information of the target object. Specifically, as shown in FIG. 3, in the North East Down coordinate system, the coordinates of the target object may be t (tx, ty), the imaging location information of the selected first group of imaging information may be d1 (d1$x$, d1$y$), the yaw angle in the imaging angle information may be yaw1, the imaging location information of the selected second group of imaging information may be d2 (d2$x$, d2$y$), the yaw angle in the imaging angle information may be yaw2. Based on the imaging angle information of the two imaging locations, k1=1/tan(yaw1), k2=1/tan(yaw2) may be calculated to obtain a distance of d1 to the plane where the target object is located, L1=d1$x$−k1*d1$y$, and a distance of d2 to the plane where the target object is located, L2=d2$x$−k2*d2$y$. Further calculation may obtain the coordinates of the target object t as: tx=k1*ty+L1, ty=(L1−L2)/(k2−k1). In the meantime, the pitch angle of the imaging angle information of the first group of imaging information may be pitch1, the pitch angle of the imaging angle information of the second group of imaging information may be pitch2. The heights of the target object may be estimated as e1$z$, e2$z$, where e1$z$=d1$z$−L1*tan(pitch1), e2$z$=d1$z$−L2*tan(pitch2). The height of the target object may be calculated based on the estimated heights as tz=(e1$z$+e2$z$)/2. Therefore, the three-dimensional coordinates of the target object ultimately obtained may be t (tx, ty, tz).

In the present disclosure, the location information of the target object may include the coordinates t calculated above. The d1 and d2 may be positioning coordinates acquired by the positioning module of the UAV, for example, the GPS coordinates obtained by the GPS positioning module of the UAV. The yaw angle and the pitch angle of the imaging angle information may be calculated based on the yaw angle of the gimbal and the distance from the image location of the target object to the Y axis of the image, and the pitch angle of the gimbal and the distance from the image location of the target object to the X axis of the image, when the image from which the target object can be recognized is captured. The detailed calculation methods can refer to the above corresponding descriptions of FIG. 2$a$ and FIG. 2$b$.

In some embodiments, determining the location information of the target object based on the at least two groups of imaging information selected from the information set may include: determining location initial estimation information of at least two target objects based on at least three groups of imaging information; determining location information of each target object based on the location initial estimation information. Specifically, when determining the location initial estimation information based on at least three groups of imaging information, each location initial estimation information may be determined based on any two groups of imaging information of the at least three groups of imaging information. The calculation of the location initial estimation information may refer to the calculation methods of the location information of the above embodiments. In this embodiment, the location information of the target object relative to the UAV may be information randomly selected from multiple pieces of location initial estimation information, or may be an average value of location coordinates corresponding to the multiple pieces of location initial estimation information. The location information may be determined according to other rules. For example, the location information may be location initial estimation information calculated based on two groups of imaging information that have the largest separation distance and/or the largest separation angle.

In some embodiments, when a location change amplitude between locations corresponding to at least two pieces of location initial estimation information from the already determined various pieces location initial estimation information satisfies a predetermined change amplitude requirement, then it is determined that a stability condition is satisfied. The location change amplitude may refer to the separation distance between the locations. Satisfying the location change amplitude requirement may include: multiple separation distances are within a predetermined value range. Based on the location change amplitude between two or more pieces of location initial estimation information, it may be determined whether the calculated location estimation of the target object is stable. The smaller the location change amplitude, the more accurate the calculated location initial estimation information. Conversely, otherwise, it indicates that under the condition that the selected imaging information is not accurate, there is an inaccurate amount in the location initial estimation information, and the location information cannot be accurately determined. Therefore, the adjustment of the imaging angle based on the location information cannot be performed, and the continuous imaging of the target object based on the location information cannot be performed.

Further, multiple situations can result in the location change amplitude between the multiple pieces of location initial estimation information to be relatively large. For example, when the target object is in a static state, and when obtaining the information set, the imaging location information or the imaging angle information of one or multiple groups of imaging information is inaccurate, which results in the calculated location information to be inaccurate. Therefore, when determining the location information of the target object, the calculation may be performed based on the calculated multiple pieces of location initial estimation information. For example, after the multiple pieces of location initial estimation information are averaged, the average value may be used as the location information of the target object.

The above describes some implementation methods for obtaining the location information of the target object. In some example, the location information of the target object obtained may include: positioning information of the smart terminal 2. The smart terminal 2 may be a terminal that communicates with the UAV. The location information may be the positioning information. In some embodiments, the smart terminal 2 may be a GPS positioning device carried by the target object. The GPS positioning device may transmit, at a certain frequency, the detected positioning information of the target object to the UAV 1, or may obtain the positioning information of the target object when the UAV 1 inquires the GPS positioning device.

In some embodiments, obtaining the orientation information of the target object relative to the UAV based on the target object recognized from an image captured by the imaging device may include: obtaining feature information of the target object to be tracked; recognizing the target object from the captured image based on the feature information and based on image recognition technology to obtain the orientation information of the target object relative to the UAV.

In some embodiments, the descriptions of recognizing the target object from the captured image based on the image recognition technology may refer to the above descriptions, which are not repeated.

Step S104: controlling a flight path of the UAV based on the location information and the flight mode.

In this step, the UAV may fly based on the actual location information of the target object and based on the flight mode in the starting instruction, thereby realizing different flight paths to obtain images from angles that are difficult to photograph, which is more suitable for satisfying the user demands. This embodiment is particularly suitable for flight paths that have a stronger regularity. It may be difficult to control the UAV to realize relatively complex and particularly flight paths that have a strong regularity through manual operations of the joystick.

In some embodiments, the flight strategy corresponding to the slant line mode may include: based on the location information, controlling the UAV to first fly along a horizontal plane (i.e., in a direction parallel to the ground) and then to fly along a plane forming a certain angle with the horizontal plane. The angle may be configured based on actual needs, such as 45°, thereby realizing imaging of the target object from different angles to obtain images with relatively rich content. It should be noted that controlling the UAV to fly along a horizontal plane means that the UAV only has a horizontal flight velocity, and does not have a vertical flight velocity (i.e., in a direction perpendicular to the ground). In some embodiments, the step of controlling the UAV to first fly along the horizontal plane and then to fly along a plane forming a certain angle with the horizontal plane may include: controlling the UAV to fly along the horizontal plane; when it is determined that an angle between a line connecting the lowest point of the target object and a center of the UAV and a line connecting the highest point of the target object and the center of the UAV is smaller than a predetermined multiple of the field of view of the imaging device, then based on the location information, controlling the UAV to fly along the plane having the certain angle with the horizontal plane. The predetermined multiple may be <1. The above process may enable the UAV to capture images having a more beautiful image composition. In some embodiments, controlling the UAV to fly along the plane forming the certain angle with the horizontal plane may include: controlling the UAV to fly along a line connecting the target object and the UAV in a direction away from the target object. The line connecting the target object and the UAV may refer to a line connecting any portion of the target object and any portion of the UAV. In some embodiments, the line connecting the target object and the UAV refers to a line connecting a center location of the target object and a center location of the UAV. A rule for determining the center location of the target object and the center location of the UAV may be set based on actual needs. For example, for the center location of the target object, a regular shape (e.g., a rectangle, a square, a pentagon, a circle, etc.) may be used to surround the target object. The center location of the regular shape may be the center location of the target object.

In some embodiments, the flight strategy corresponding to the slant line mode may include: controlling the UAV to fly in an S shape curve away from the target object based on the location information to capture images having more beautiful image compositions. A degree of curvature of the S shaped curve may be set based on actual needs to satisfy the imaging demands.

In some embodiments, using the ground as a reference, the lowest point and the highest point of the target object are the location of the target object closest to the ground and the location of the target object farthest from the ground. The angle between a line connecting the lowest point of the target object and the center of the UAV and a line connecting the highest point of the target object and the center of the UAV may be referred to as the angle of the target object relative to the UAV. For example, the target object may be a human being. The angle of the human being relative to the UAV is the angle between the line connecting the lowest point of the human being and the center of the UAV and the line connecting the highest point of the human being and the center of the UAV. In some embodiments, the predetermined multiple may be ⅓, and the target object may be on the ground. When the angle of the target object relative to the UAV is smaller than ⅓ of the field of view of the imaging device, the UAV may fly along the line connecting the target object and the UAV in a direction away from the target object, thereby rendering the horizontal line in the image to appear at the ⅓ location of the image (i.e., a pixel distance of the horizontal line to the top edge of the image occupies ⅓ of the total pixel distance of the image in the Y direction of the physical coordinate system). In the meantime, the target object also appears in the captured image, thereby obtaining the image having a more beautiful image composition.

In some embodiments, the flight strategy corresponding to the circling mode may include: based on the location information, controlling the UAV to fly circling around the target object based on a specified distance. In this embodiment, the UAV uses the target object as a center, and circles the target object to move circumferentially, thereby realizing imaging of the target object from 360° directions. The shape of the flight path for flying circling around the target object may be selected based on actual needs. In some embodiments, the flight path for flying circling around the target object may be a circle. In some embodiments, the flight path for flying circling around the target object may be an oval. In some embodiments, the flight circling around the target object may along a flight path that is similar to a circle or oval. The specified distance may indicate a distance of the UAV to the target object at each location. In some embodiments, the specified distance may be a default distance. In some embodiments, the flight strategy corresponding to the circling mode may include a default distance. In some embodiments, the specified distance may be distance information input by the user. That is, the user may set the distance information for the UAV to fly circling around the target object based on the actual needs. Thus, different user demands may be satisfied. In some embodiments, after the user selects the circling mode at the smart terminal 2, the user may input at the smart terminal 2 a specified distance corresponding to the circling mode, for indicating the distance information for the UAV to fly circling around the target object. In some embodiments, a distance between the UAV and the target object at a current time instance may be calculated based on the location information of the target object and the positioning information of the UAV at the current time instance, thereby further improving the intelligibility of the UAV.

In some embodiments, the flight strategy corresponding to the spiral mode may include: based on the location information, controlling the UAV to fly circling around the target object in a flight path having a shape of a Fibonacci spiral, an equal ratio spiral, an equiangular spiral, an Archimedean spiral, or a spiral of other shapes. In this embodiment, the UAV may use the target object as a center to fly based on a flight path having a shape of a Fibonacci spiral, an equal ratio spiral, an equiangular spiral, an Archimedean spiral, or a spiral having other shapes, thereby capturing images having richer content. In some embodiments, in order to image the target object from more angles and directions, the flight strategy corresponding to the spiral mode may also include: based on the location information, while controlling the UAV to fly circling around the target object in a flight path having a shape of a Fibonacci spiral, an equal ratio spiral, an equiangular spiral, an Archimedean spiral, or a spiral of other shapes, in the meantime, also controlling the UAV to ascend or descend perpendicular to the ground based on a predetermined speed. In this embodiment, by controlling the UAV to ascend or descend in the direction perpendicular to the ground, imaging the target object from more angles may be realized, thereby enhancing the richness of the content of the captured images. The ascending or descending flight velocity of the UAV may be set based on actual needs. In some embodiments, the UAV may fly, based on the location information, and based on the flight path having a shape of a Fibonacci spiral, an equal ratio spiral, an equiangular spiral, or an Archimedean spiral, along a horizontal plane circling around the target object. That is, the UAV only has a flight velocity in the horizontal direction. The flight velocity in the vertical direction may be zero. Through the disclosed flight, the size of the target object in the captured image may be changed, thereby enhancing the richness of the captured images.

In some embodiments, the flight strategy corresponding to the roaring mode may include: based on the location information, controlling the UAV to fly slantly according to a predetermined angle to a first specified location relative to the target object, and then controlling the UAV to ascend perpendicular to the ground. The predetermined angle, the first specified location, and the flight velocity of the UAV ascending may be set based on actual needs, thereby realizing capturing diversified images. In some embodiments, the first specified location refers to a location having a specified distance to a specified location of the target object, and the first specified location may be located in a specified orientation relative to the specified location of the target object. In some embodiments, the first specified location may be set by the user based on the actual needs. In some embodiments, controlling the UAV to fly slantly according to a predetermined angle to the first predetermined location of the target object may include: controlling the UAV to fly in a direction moving closer to the target object to the first specified location. In some embodiments, controlling the UAV to fly slantly according to the predetermined angle to the first specified location of the target object may include: controlling the UAV to fly to the first specified location in a direction moving away from the target object.

In addition, in the roaring mode, the UAV may be controlled to fly from any starting point (i.e., the current location of the UAV) to the first specified location. Alternatively, the UAV may be controlled to fly to a specified starting point, and then be controlled to fly from the specified starting point to the first specified location. It should be noted that in the situation where the UAV is first controlled to fly to the specified starting point and then controlled to fly from the specified starting point to the first specified location, the imaging device of the UAV starts video recording after the UAV arrives at the specified starting point.

In some embodiments, the flight strategy corresponding to the comet circling mode may include: based on the location information, controlling the UAV to fly to a second specified location in a direction moving closer to the target object, and after circling around the target object starting from the second specified location, fly away from the target object. In some embodiments, the second specified location may be set based on actual needs. For example, the second specified location may be a location having a specified distance to a specified location of the target object, and the second specified location may be located in a specified orientation of the specified location of the target object. As a result, diversified images can be captured. In addition, in this embodiment, the number of circles that the UAV circles around the target object after flying to the second specified location may be set based on actual needs, such as one circle, multiple circles, or less than one circle.

In some embodiments, in the comet circling mode, the UAV may be controlled to fly from any starting point (i.e., the current location of the UAV) in a direction moving closer to the target object to arrive at the second specified location, and to fly away from the target object after circling around the target object from the second specified location.

In some embodiments, in the comet circling mode, the UAV may be controlled to fly to a specified starting point, and then be controlled to fly from the specified starting point in a direction moving closer to the target object until it arrives at the second specified location. The UAV may be further controlled to fly away from the target object after flying circling around the target object from the second specified location. In this embodiment, the imaging device of the UAV may start video recording after the UAV arrives at the specified starting point. In addition, in this embodiment, the flight path of the UAV may use the target object as a base point, or may be controlled based on coordinates in the global coordinate system.

In the above embodiment, controlling the UAV to implement the flight path corresponding to the flight strategy is based on the premise that the target object is in the image. In other embodiments, after the location information of the target object is obtained, the aircraft may pre-fly along a segment of a flight path without facing the target object, and then fly facing the location indicated by the location information of the target object, thereby satisfying different flight demands.

Step S105: based on the orientation information, controlling attitude of a gimbal to render the target object to appear in an image captured by an imaging device.

In some embodiments, the attitude of the gimbal may be controlled such that the target object consistently appears at a predetermined location in the captured images, thereby rendering the target object to consistently appear in the captured images. The orientation information may be the predetermined location. In some embodiments, the target object being located in the predetermined location of the captured images means that the specified location of the target object is at the predetermined location in the captured images. In some embodiments, the specified location of the target object is the center location of the target object. The predetermined location where the target object is located in the captured images is the predetermined location in the captured images where the center location of the target object is located. In some embodiments, the predetermined location may be generated by the user directly clicking any location in a region of a user interface of the smart terminal 2 that is configured for displaying the captured images. That is, the specified location is a clicking location input by the user at the user interface. In some embodiments, the predetermined location may be selected as a default location the specified location of the target object is displayed in the captured images.

In some embodiments, to obtain better image composition effect, the attitude of the gimbal may be controlled such that the size of the target object in the captured images maintains a predetermined size. The orientation information may be the center location information of the predetermined size or other location information (e.g., vertex angle information) in a region corresponding to the predetermined size. In this embodiment, the size of the target object in the captured images is a production of a pixel height and a pixel width of the target object in the captured images. In some embodiments, the predetermined size may be a size frame directly input by the user at the user interface of the smart terminal 2. In some embodiments, the predetermined size may be a default size frame. Regardless of whether the predetermined size is a size frame set by the user or a default size frame, in subsequent imaging processes, the target object is located in the size frame in the captured images. In some embodiments, the size of the size frame may be configured to be just enough to surround the target object in the captured images, thereby satisfying an image composition demand of the user. In some embodiments, the size frame may have a shape of a rectangle, a square, etc.

In some embodiments, after the flight path of the UAV is determined, the attitude of the gimbal may be controlled based on a deviation of the actual location of the target object in the images relative to the expected display location, such that the target object is displayed at the expected display location (i.e., the predetermined location) in the captured images. That is, the location of the target object displayed in the captured images may be maintained at the predetermined location. Specifically, if there is a left-right deviation in the actual location of the target object in the captured images relative to the expected display location, the yaw angle of the gimbal may be controlled to maintain the target object at the expected display location; if there is an up-down deviation in the actual location of the target object in the captured images relative to the expected display location, the pitch angle of the gimbal may be controlled to maintain the target object at the expected display location.

In some embodiments, location coordinates where the center location of the target object to be tracked may be expected to be displayed may be P (u, v), where u is the pixel coordinates of the X axis, and v is the pixel coordinates of the Y axis. The size of the image may be (W, H), where W is the pixel width of the image, H is the pixel height of the image. If the upper left corner of the image is set as the origin, then the angular velocity Yx of the gimbal rotating around the yaw axis may be:

$$Yx=\mu^*(u-w/2),$$

where $\mu$ is a constant, and $\mu \in R$ (R represents real numbers);

the angular velocity Yy of the gimbal rotating around the pitch axis may be:

$$Yy\omega^*(v-h/2),$$

where $\omega$ is a constant, and $\omega \in R$.

To maintain the size of the target object in the captured images to be the predetermined size, after the flight path of the UAV is determined, the focal length of the imaging device may be adjusted based on the size of the target object in the captured images. In some embodiments, at the initial time instance (e.g., a time instance before the smart terminal 2 transmits a starting instruction to the UAV 1), the pixel area (i.e., the predetermined size) of the target object in the captured images is S (S is defined as the pixel height of the target object times the pixel width of the target object). During the tracking of the target object, the pixel area of the target object in the captured images may be s. Then the adjustment speed F of the focal length of the imaging device may be:

$$F=\gamma^*(1-s/S),$$

where $\gamma$ is a constant, and $\gamma \in R$ (R represents real numbers).

In some embodiments, during the tracking of the target object, if the pixel area of the target object in the captured images is smaller than a predetermined pixel area of a predetermined size, then the focal length of the imaging device may be adjusted to be longer; otherwise, the focal length of the imaging device may be adjusted to be shorter.

In some embodiments, controlling the attitude of the gimbal may include: controlling at least one of the pitch angle, the yaw angle, or the roll angle, and controlling the location of the target object in the captured images. In some embodiments, the gimbal may be a three-axis gimbal. The attitude of the gimbal may be changed by controlling at least one of the pitch axis, yaw axis, and roll axis of the three-axis gimbal.

In some embodiments, the gimbal and the UAV may be fixed relative to one another in a heading (i.e., flight direction) axis. Controlling the attitude of the gimbal may include: controlling the pitch angle and/or the roll angle of the gimbal; controlling a heading angle of the UAV to control the yaw angle of the gimbal. In some embodiments, the gimbal may have two degrees of freedom: the pitch angle and the roll angle. Another degree of freedom, i.e., the yaw angle, of the gimbal may be replaced by the heading angle of the UAV. Thus, the control of the yaw angle of the gimbal may be realized by controlling the heading angle of the UAV.

In some embodiments, to realize the aesthetics of the image composition of the captured images, the process of determining the pitch angle and/or the yaw angle of the gimbal may include: determining at least one of the pitch angle or the yaw angle of the gimbal based on an expected display location of a specified location of a background identification in the captured images. In this embodiment, by setting the expected display location of the specified location of the background identification in the captured images, diversified image composition demands may be satisfied, thereby enhancing the richness and the aesthetics of the captured images. The background identification may include at least one of a ground, a sky, a sea surface, a building, or other background identification. In FIG. 4, using the ground as an example of the background identification, the user may set the horizontal line to be substantially perpendicular to the Y axis of the physical coordinate system of the captured image and may be located at about ⅓ of the Y axis. The UAV may calculate the pitch angle of the gimbal based on the expected display location of the horizontal line in the captured images, thereby controlling the pitch angle of the gimbal, such that the horizontal line is displayed at the ⅓ location of the Y axis in the captured images, to obtain better image compositions.

In some feasible embodiments, determining at least one of the pitch angle or the yaw angle of the gimbal based on the expected display location of the specified location of the background identification in the captured images may include: obtaining a first total pixel distance of a captured image in a first direction and a pixel distance of the expected display location of the specified location of the background identification in the captured image to an edge of the image in the first direction, where the first direction may correspond to the pitch direction or the yaw direction of the gimbal; determining the pitch angle and/or the yaw angle of the gimbal based on the first total pixel distance, the pixel distance, and the size of the vertical field of view or the horizontal field of view of the imaging device. In some embodiments, the pixel distance of the upper edge in the first direction, i.e., the Y axis direction of the captured image, may be row, the first total pixel distance (i.e., the image height) may be row_size, the vertical field of view of the camera may be VFOV, then, under simplified conditions, the pitch angle of the gimbal may be calculated as:

pitch=(row_size/row_size−0.5)*VFOV.

In some embodiments, the location of the background identification in the captured images may not be set. For example, if the image composition is a high angle shot without a horizontal line, the process for determining the pitch angle and/or the yaw angle of the gimbal may include: obtaining an elevation angle and/or a horizontal angle of a predetermined imaging location; determining a deviation angle of the target object relative to a center line (i.e., the X axis or the Y axis of the physical coordinate system in the captured images) of the first direction of the captured image, the first direction corresponding to the pitch direction or the yaw direction of the gimbal; determining the pitch angle and/or the yaw angle of the gimbal based on the deviation angle and the elevation angle and/or the horizontal angle. In some embodiments, the elevation angle and/or the horizontal angle of the imaging location may be directly set by the user. Assuming the imaging location information corresponding to the imaging location is (x, y, z), a directional angle may be defined by the imaging location pointing to the target object. The elevation angle may be defined as arctan (z/x), the horizontal angle may be defined as arctan (y/x). The user setting the elevation angle is to set the ratio between x and z. The user setting the horizontal angle is to set the ratio between x and y. In some embodiments, determining the deviation angle of the target object relative to the center line of the first direction of the captured image may include: obtaining a first total pixel distance of the captured image in the first direction and the vertical field of view and/or horizontal field of view of the imaging device; determining a first deviation pixel distance of the target object to the center line of the first direction of the captured image; determining the deviation angle of the target object relative to the center line of the first direction of the captured image based on the first total pixel distance, the vertical field of view and/or the horizontal field of view, and the first deviation pixel distance. It should be noted that when computing the pitch angle of the gimbal, the deviation angle of the target object relative to the center line of the first direction of the captured image is determined based on the vertical field of view, and when computing the yaw angle of the gimbal, the deviation angle of the target object relative to the center line of the first direction of the captured image is determined based on the horizontal field of view.

In some embodiments, referring to FIG. 5, after the user sets the expected display location of the target object in the captured image, the first deviation pixel distance of the center of the target object relative to the X axis may be determined as d_rows. The user may set the elevation angle of the imaging location to be theta. The first total pixel distance of the image (i.e., the height of the image) may be set as row_size, the vertical field of view of the imaging device may be VFOV, then the pitch angle "pitch" of the gimbal may be calculated as:

pitch=−theta−d_rows/row_size*VFOV;

or pitch=−arctan(z/x)−d_row/row_size*VFOV.

In some embodiments, controlling the flight path of the UAV based on the location information and the flight mode may include: determining a distance between the target object and the imaging device; controlling the flight path of the UAV based on the location information, the flight mode, and the distance between the target object and the imaging device, such that the height of the target object displayed in the captured image is a specified height, thereby satisfying a user demand for the image composition. In some embodiments, determining the distance between the target object and the imaging device may include: obtaining an actual height of the target object and a first total pixel distance of the captured image in the first direction; obtaining a pixel distance corresponding to the actual height of the target object to be displayed in the first direction of the captured image, where the first direction corresponds to the pitch direction of the gimbal; determining a distance between the target object and the imaging device based on the actual height of the target object, the first total pixel distance, and the pixel distance corresponding to the actual height of the target object in the first direction of the captured image. In some embodiments, as shown in FIG. 5, the actual height of the target object may be h, the distance between the UAV and the target object may be defined as d (d=sqrt(x*x+y*y+z*z)), the elevation angle of the imaging location set by the user may be theta, the height of the image may be row_row, the vertical field of view of the imaging device may be VFOV. If during the image composition, the user expects the height (i.e., the height in the Y axis direction) of the target object to be displayed in the captured image to be tar_rows, then the distance d may satisfy:

cos(theta)*h/(2*d)=tan(tar_rows/(2*row_siz) *VFOV).

In some embodiments, if during image composition, the target object need not be displayed at the horizontal (i.e., X axis) center of the captured image, then to accomplish image composition, after determining the distance between the target object and the imaging device, the method may further include: obtaining the elevation angle of a predetermined imaging location, a horizontal field of view of the imaging device, a second total pixel distance of the captured image in a second direction, wherein the second direction corresponds to the yaw direction of the gimbal; determining a second pixel deviation distance of the target object relative to a center line of the second direction of the captured image; determining a moving distance in the pitch direction of the gimbal based on the second pixel deviation distance, the elevation angle, the horizontal field of view, the second total pixel distance, and the distance between the target object and the imaging device; controlling the attitude of the gimbal based on the moving distance in the pitch direction of the gimbal. In some embodiments, as shown in FIG. 5, the second pixel deviation distance of the target object relative to the X axis may be d_col, the second total pixel distance of the image in the X axis direction may be col_size, the horizontal field of view of the camera may be HFOV, the distance between the UAV and the target may be d, the elevation angle of the imaging location set by the user may be theta, then the moving distance y in the pitch direction of the gimbal may be:

$$y=\sin(d\_col/col\_size*HFOV)*d*\cos(theta).$$

In some embodiments, during the image composition, if the target object need not be displayed at the horizontal (i.e., X axis) center of the captured image, then to accomplish the desired image composition, the attitude of the gimbal may be controlled, including: obtaining a horizontal field of view of the imaging device, a second total pixel distance of the captured image in a second direction, where the second direction corresponds to the yaw direction of the gimbal; determining a second pixel deviation distance of the target object to a center line of the second direction of the captured image; determining a yaw angle of the gimbal based on the second total pixel distance, the horizontal field of view, and the second pixel deviation distance; controlling the attitude of the gimbal based on the yaw angle. In some embodiments, as shown in FIG. 5, the second pixel deviation distance of the target object relative to the X axis may be d_col, the second total pixel distance of the image in the X axis direction may be col_size, the horizontal field of view of the camera may be HFOV, then the yaw angle of the gimbal may be d_col/col_size*HFOV.

In some embodiments, the image composition may use the location in the captured image where the target object or the background identification is to be displayed as the basis for image composition. In some embodiments, background identifications such as sky, building, or sea surface, etc., may be recognized through a classification algorithm such as convolutional neural network ("CNN"), thereby achieving better image composition.

In the above descriptions, the coordinate system XOY of the target object is used as a reference to deduce the location relationship between the target object and the UAV. When the UAV is in flight, the location relationship between the target object and the UAV may be deduced through other methods. In some embodiments, the user operating the UAV may be the target object. The UAV may take off from the palm of the user. The location difference between the UAV and the user may be ignored, and it may be assumed that the locations of the UAV and the target object are on a same straight line. In some embodiments, the user operating the UAV may be the target object. The UAV may take off from the palm of the user by scanning the face of the user. The imaging device may be mounted at the front side of the aircraft body of the UAV. When scanning the face, the user may extend both arms, such that the imaging device faces the face of the user. The location relationship between the UAV and the user may be deduced based on an assumed typical length of the arm and a size of the human face.

In some embodiments, by setting the flight mode, the UAV may autonomously fly based on the set flight mode and the location information of the target object, thereby realizing relatively complex flight paths, especially the flight paths having a strong regularity. By obtaining orientation information of the target object relative to the UAV through image recognition, the attitude of the gimbal may be controlled, such that the target object is located in the captured image. According to the present disclosure, manual control by the operator is not needed for realizing the control of the UAV and the gimbal. The captured images are smoother, and the image compositions are richer and more accurate.

In some embodiments, when the target object cannot be recognized through image recognition from the captured images, the orientation information of the target object relative to the UAV may not be determined, which result in the UAV being unable to control the attitude of the gimbal based on the orientation information to render the target object to be located in the captured images. In order to continue to track and image the target object after the target object is lost, in one embodiment, the method may also include: when it is determined that the target object cannot be recognized in the image, then replacing the step of controlling the attitude of the gimbal based on the orientation information by a step of controlling the attitude of the gimbal based on the location information.

In some embodiments, controlling the flight path of the UAV based on the location information and the flight mode may include: controlling the UAV to move to a reset location. In some embodiments, after the UAV accomplishes a flight based on the flight strategy of the flight mode, the UAV may automatically move to the reset location, such that the UAV is consistently located at the same takeoff location. The reset location may be a specific positioning coordinate location obtained by the UAV through GPS positioning. It should be noted that during the process of the UAV moving to the reset location, if the UAV receives a joystick operation signal transmitted by an external device (e.g., a remote control device that controls the operation of the UAV), the UAV may immediately terminate the current operation for moving to the reset location.

In some embodiments, the method may also include: if the joystick operation signal transmitted by the external is received, controlling at least one of the flight of the UAV or the attitude of the gimbal based on the joystick operation signal. In this embodiment, the joystick operation signal is generated through the user operating a remote control device that controls the UAV. In some embodiments, the joystick operation signal may include at least one of a signal controlling the UAV to ascend or descend perpendicular to the ground, a signal controlling the UAV to move away or closer to the target object, a signal for controlling the flight velocity of the UAV, a signal for controlling the yaw angle of the gimbal, a signal for controlling the rotation of the aircraft body of the UAV, or a signal controlling other UAV parameters or gimbal parameters.

Figure 7:
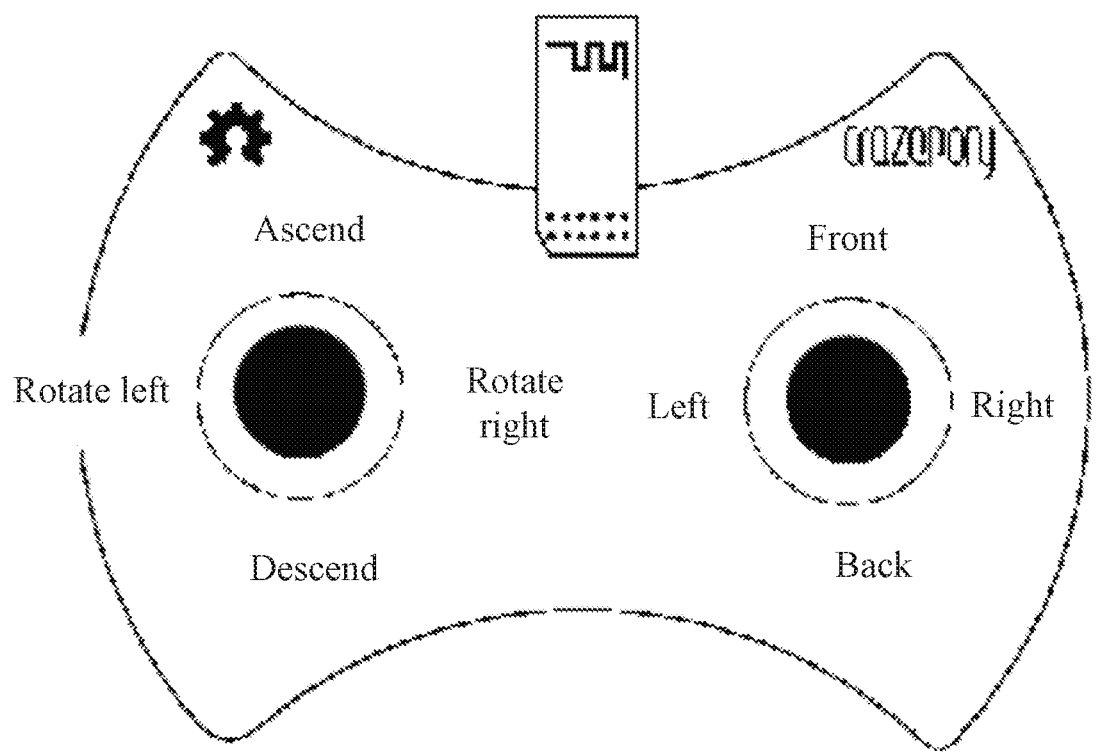
FIG. 7 is schematic diagram of a remote control device, according to an example embodiment.

Referring to FIG. 7, the remote control device that controls the UAV may include two joysticks. Each joystick may include four adjustment direction for four degrees of freedom. One of the joysticks may include the ascend/descend and left rotation/right rotation operations. Another joystick may include the fore/aft and left/right operations. The ascend/descend correspond to the ascend/descend operations for the height of the UAV. The left rotation/right rotation correspond to the yaw of the gimbal. The left/right correspond to the roll of the gimbal. The fore/aft correspond to the pitch of the gimbal.

In some embodiments, when the UAV is in a circling mode, the left rotation/right rotation may be controlled, which respectively correspond to the left and right image compositions of the target object in the captured image, i.e., the left and right locations of the target object in the captured image. The fore/aft controls respectively correspond to the increase and decrease of the circling radius of the UAV circling around the target object. The ascend/descend controls respectively correspond to the increase and decrease of the UAV height (in a direction perpendicular to the ground) while the UAV circles around the target object.

In some embodiments, when the UAV is in the slant line mode, the left rotation/right rotation controls respectively correspond to the left and right image compositions of the target object in the captured image, i.e., the left and right locations of the target object in the captured image. The fore/aft controls correspond to the acceleration and deceleration of the flight velocity of the UAV. The left/right and ascend/descend controls are ineffective operations.

In some embodiments, when the UAV is in the roaring mode, the left rotation/right rotation controls correspond to the rotation of the aircraft body of the UAV, and are configured to control the rotation of the aircraft body, thereby realizing the rotation of the lens of the imaging device, to obtain a rotating shot using the target object as a center, further increasing the aesthetics of the captured image. The fore/aft controls and the left/right controls are ineffective operations. The ascend/descend controls respectively correspond to the acceleration and deceleration of the ascending velocity of the UAV.

In some embodiments, when the UAV is in the spiral mode, the left rotation/right rotation controls respectively correspond to the left and right image compositions of the target object in the captured image, i.e., the left and right locations of the target object in the captured image. The fore/aft controls respectively correspond to the increase and decrease of the spiral radius. The left/right controls respectively correspond to the acceleration and deceleration of the transversal flight velocity (i.e., in the direction parallel with the ground) of the spiral flight. The ascend/descend controls respectively correspond to the acceleration and deceleration of the spiral ascending velocity of the UAV, or the acceleration and deceleration of the spiral descending velocity of the UAV.

Embodiments of the present disclosure also provide an imaging control method. The method may be implemented in a smart terminal 2 installed with at least one application ("APP"). In some embodiments, the smart terminal may be communicatively connected with the UAV.

Figure 8:
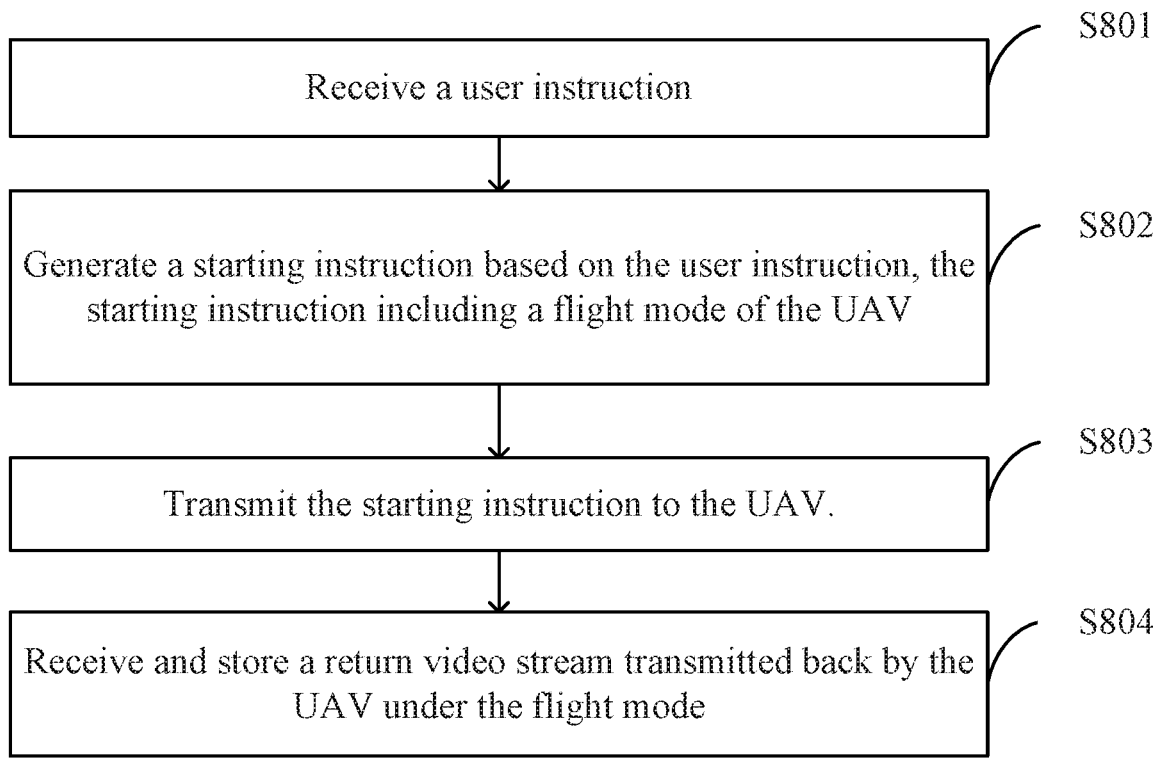
FIG. 8 is a flow chart of an imaging control method at the smart terminal side, according to an example embodiment.

Referring to FIG. 8, the imaging method may include the following steps:

Step S801: receiving a user instruction;

where the user instruction may be directly input at the smart terminal 2 by the user. In one embodiment, the smart terminal 2 may include an APP for the user to input the user instruction. In some embodiments, the APP may be configured to display the images transmitted back from the UAV.

In some embodiments, the user instruction may include: determining a target object to be recognized. In some embodiments, after determining the target object to be recognized, the method may also include: recognizing feature information of the target object to be tracked in the currently displayed image. The feature information may be a predetermined location or a predetermined size of the target object to be displayed in the captured image. In some embodiments, the user interface of the smart terminal may display in real time the image captured by the imaging device at the current time instance. The user may directly click the target object to be recognized on the image of the current time instance. The smart terminal may recognize the target object selected by the user based on image recognition technology to obtain feature information of the target object to be recognized. The feature information of the target object may be a predetermined location of the target object, or a predetermined size of the target object, or other information such as the grayscale, texture, etc., which may make it convenient for the subsequent tracking of the target object. In some embodiments, the method for the user to select the target object to be recognized may include: the user directly clicking an object in the image of the current time instance displayed in the user interface of the smart terminal, then the object becomes the target object to be recognized. In some embodiments, the method for the user to select the target object to be recognized may include: the user uses a size frame to surround an object in the image of the current time instance displayed in the user interface of the smart terminal, then the surrounded object becomes the target object to be recognized. In some embodiments, the size frame may be just enough to surround the target object to be recognized, or the size frame may be the minimum regular graphic frame (e.g., the square frame or the circular frame) that can surround the target object to be recognized. In some embodiments, the feature information may include a predetermined location or a predetermined size of the target object in the captured image, thereby instructing the UAV 1 to control the attitude of the gimbal such that the target object is consistently located at the predetermined location in the captured images, and the size of the target object in the captured images is consistently the predetermined size, in order to obtain better image composition effects.

In some embodiments, the predetermined location of the target object in the captured images is a predetermined location of a center location of the target object (which may be other locations of the target object) in the image of the current time instance, when the user selects the target object to be recognized. The predetermined size of the target object in the captured image is a value of the production of a pixel height and a pixel width of the target object in an image captured at the current time instance. In some embodiments, in order to improve the aesthetics of the image composition of the captured images and to enhance the richness of the content of the captured images, the user instruction may include: an expected display location of a specified location of a background identification in the captured image. As a result, diversified image composition demands may be satisfied. The richness and aesthetics of the captured images may be enhanced. Specifically, in some embodiments, the background identification may include at least one of a ground, a sky, a sea surface, a building, or other background identification.

In some embodiments, the user instruction may include: an elevation angle or a horizontal angle of an imaging location, which may be used to further determine a pitch angle or a yaw angle of a gimbal, thereby providing better image compositions, such that the target object is located at a predetermined location in the captured images.

In some embodiments, the user instruction may include: at least one of a flight distance and a flight velocity, which may be used to instruct the UAV to automatically accomplish a flight in each flight mode based on the flight distance and/or the flight velocity. The flight distance and flight velocity corresponding to each flight mode may be set based on actual needs, thereby satisfying diversified demands of the user.

Step S802: generating a starting instruction based on the user instruction. The starting instruction may include a flight mode of the UAV. The starting instruction may be configured to trigger the autonomous flight of the UAV based on the flight mode.

In some embodiments, the flight mode may be a default flight mode. The default flight mode may be a predetermined flight mode or a combination of multiple predetermined flight modes. Specifically, after the smart terminal 2 receives the user instruction (e.g., after the user presses an operation button or inputs certain instruction information), the smart terminal 2 may select the default flight mode and may generate the starting instruction based on the default flight mode.

In some embodiments, the user instruction may include a mode selection instruction. The mode selection instruction may include a flight mode for instructing the flight of the UAV. In some embodiments, the user may select the flight mode of the UAV based on actual needs. Specifically, the smart terminal 2 may be pre-set with multiple flight modes for the user to select. The user may select one or more flight modes from the multiple selectable flight modes provided by the smart terminal 2 based on actual needs, thereby instructing the UAV to realize flights based on different flight modes, to obtain captured images from different field of views.

In some embodiments, the flight mode may include at least one of a slant line mode, a circling mode, a spiral mode, a roaring mode, a comet circling mode, or other flight mode (e.g., a straight line mode). Each flight mode may include a corresponding flight strategy. The flight strategy may be configured to instruct the flight of the UAV. The flight strategy corresponding to each flight mode may refer to the above related descriptions.

Step S803: transmitting the starting instruction to the UAV.

Step S804: receiving and storing a return video stream transmitted back by the UAV under the flight mode.

In each flight mode, the UAV may store, in real time, the current video data (i.e., the raw data stream) captured by the imaging device, and may compress the raw data stream in real time to generate a return video stream and transmit it back to the smart terminal 2, such that the smart terminal 2 can display, in real time, the images currently captured by the UAV.

In step S804, after the smart terminal 2 receives the return video stream, the smart terminal 2 may cache the received return video stream, thereby obtaining a complete return video stream captured by the UAV in the flight mode.

In some embodiments, the user may set the flight mode on the smart terminal 2, such that the UAV can autonomously fly based on the flight mode set by the user and the location information of the target object. As a result, the UAV may realize relatively complex flight paths, particularly the flight paths having a relatively strong regularity. The UAV may obtain orientation information of the target object relative to the UAV through image recognition, thereby controlling the attitude of the gimbal, such that the target object is located in the captured images. The control of the UAV and the gimbal may be realized without requiring an operator to manually control the remote control device. The captured images are smoother, and the image compositions are richer and more accurate.

In some embodiments, in the field of UAV, the return video stream transmitted by the UAV during a flight is generally provided to the user for directly viewing. Because the size of the video stream transmitted to a ground based device (e.g., a smart terminal such as a smart phone, a tablet, etc.) from the UAV during the flight is typically large, the user may have difficult in sharing the return video stream transmitted from the UAV in his/her social media platform, such as his/her friend circle. Currently, in most situations, the user needs to manually edit the return video stream transmitted from the UAV to obtain a small video that is more convenient for sharing. However, the manual editing performed by the user to obtain the small video may not be professional, and the special effect of the small video may be poor. To address the above issue, referring to FIG. 9, after step S804, the method may also include:

Step S901: processing the return video stream to a generate video footage of a first predetermined duration. The first predetermined duration may be shorter than a duration of the return video stream.

This embodiment does not need the manual editing of the user. Through the processing of the return video stream, the large return video stream can be converted into a small video that is convenient for sharing (i.e., a video footage of the first predetermined duration). The user may conveniently share the video in social media platforms, such as his/her friend circle. The first predetermined duration may be set based on actual needs, such as 10 seconds, which makes the small video convenient for sharing.

It should be noted that the small video of the present disclosure refers to a video having a duration shorter than a specified duration (which may be set based on actual needs). Of course, in some embodiments, the small video may refer to a video having a size or capacity smaller than a specified size or capacity (which may be set based on actual needs).

Step S901 may be executed after it is determined that the UAV satisfies a specified condition.

In some embodiments, the specified condition may include: the UAV accomplishes a flight in the flight mode. In this embodiment, at the same time the UAV accomplishes the flight in the flight mode, the smart terminal 2 may receive a complete return video stream captured by the UAV in the flight mode, which makes it convenient for the user to select a processing direction based on all or some of the information included in the return video stream.

In some embodiments, the smart terminal 2 may determine, based on the return video stream transmitted back by the UAV, whether the UAV accomplishes the flight in the flight mode. In some embodiments, the UAV may add flight status information corresponding to the flight mode in the images captured during the flight in the flight mode, and may compress in real time the raw data stream having the flight status information, and transmit the compressed raw data stream to the smart terminal 2. That is, the return video stream obtained by the smart terminal 2 may also include the flight status information. The smart terminal 2 may determine, based on the flight status information included in the return video stream, whether the UAV accomplishes the flight in the flight mode. Specifically, if the smart terminal 2 determines that the flight status information included in the return video stream changes from the flight status information corresponding to the flight mode to the flight status information corresponding to another flight mode, or the return video stream changes from a return video stream having the flight status information corresponding to the flight mode to a return video stream that does not have the flight status information, it may indicate that the UAV has accomplished the flight in the flight mode.

In some embodiments, after the UAV accomplishes the flight in the flight mode, the smart terminal 2 may receive information indicating the termination of the flight mode from the UAV. As a result, the smart terminal 2 may determine that the UAV has accomplished the flight in the flight mode.

In some embodiments, the specified condition may include: receiving a return video stream transmitted back from the UAV while the UAV flies in the flight mode. In some embodiments, the smart terminal 2 may execute step S901 immediately after receiving the return video stream transmitted from the UAV while the UAV flies in the flight mode, without waiting for the UAV to complete the execution of the flight mode. This may save time spent for generating the small video. The smart terminal 2 may generate the small video at the same time when the UAV completes the flight in the flight mode.

To reduce the size of the return video stream, and to generate the small video that is convenient for sharing, in some embodiments, step S901 may include: processing the return video stream with frame extraction to generate a video footage of a first predetermined duration.

Specifically, in some embodiments, processing the return video stream with frame extraction to generate the video footage of the first predetermined duration may include: processing the return video stream with frame extraction based on at least one of the flight mode, a flight velocity, or a flight direction of the UAV, to generate the video footage of the first predetermined duration. By associating the small video to be generated with at least one of the flight mode, the flight velocity, or the flight direction of the UAV, a degree of fit between the small video and the images captured by the UAV may be higher. In addition, the images included in the small video to be generated may be richer, and the image compositions may better match the flight parameters of the UAV.

In some embodiments, processing the return video stream with frame extraction to generate the video footage of the first predetermined duration may include: processing the return video stream with frame extraction based on a duration of the return video stream and a number of frames of the return video stream, to generate the video footage of the first predetermined duration. In this embodiment, while the size of the return video stream is reduced to generate the small video that is convenient for sharing, a small video having a higher degree of fit with the return video stream may be obtained based on the number of frames of the return video stream, thereby presenting the images captured by the UAV in a relatively complete manner.

In some embodiments, in order to present the images captured by the UAV in a relatively complete manner, processing the return video stream with frame extraction based on the duration of the return video stream and the number of frames of the return video stream, to generate the video footage of the first predetermined duration may include: dividing the return video stream into multiple segments to obtain multiple segments of the return video stream; processing a portion of the multiple segments of the return video stream with frame extraction to obtain frame extraction images of the corresponding segments of the return video stream; and generating the video footage of the first predetermined duration based on another portion of the return video stream and the frame extraction images of the corresponding segments of the return video stream.

In some embodiments, to reserve a beginning portion and an ending portion of the images captured by the UAV so as to ensure the integrity of the generated small video, dividing the return video stream into multiple segments may include: dividing the return video stream into at least three segments based on a sequential order in the imaging time. Processing a portion of the multiple segments of the return video stream with frame extraction to obtain frame extraction images of the corresponding segments of the return video stream may include: processing a segment of the return video stream whose imaging time is located at a middle time segment among the at least three segments of the return video stream with frame extraction, to obtain the frame extraction images corresponding to this segment of the return video stream.

In some embodiments, to obtain a relatively smooth video footage, processing a portion of the multiple segments of the return video stream with frame extraction to obtain frame extraction images of the corresponding segments of the return video stream may include: processing a corresponding segment of the return video stream with frame extraction based on a predetermined frame extraction speed, to obtain the frame extraction images of the corresponding segment of the return video stream. In this embodiment, the frame extraction is performed on the corresponding segment of the return video stream at a constant speed, thereby avoiding discontinuity in the video footage that may be caused by non-constant frame extraction speed. In some embodiments, the frame extraction speeds for the multiple segments of the return video stream may be the same, which further improves the continuity of the generated video footage, thereby ensuring that the generate video footage is relatively smooth.

In some embodiments, step S901 may include: compressing the return video stream to reduce a size of the return video stream, and to obtain a video footage that is convenient for sharing.

In some embodiments, the method may also include: transmitting the video footage to a remote terminal server, thereby realizing sharing of the small video. The remote terminal server may be a third-party website, such as video sharing websites Youku™, Tudou™, etc., or social media networks, such as friend circle. In some embodiments, the step of transmitting the video footage to the remote terminal server may be executed after step S901 is completed, thereby realizing quick sharing of the small video. In some embodiments, prior to transmitting the video footage to the remote terminal server, the method also includes: receiving a sharing instruction input by a user. The sharing instruction may include the corresponding remote terminal server. The video footage may be transmitted to the remote terminal server based on the sharing instruction, thereby realizing flexible sharing of the small video based on actual needs of the user.

In some embodiments, during a flight of the UAV, if the signal of the transmission link between the UAV and the smart terminal 2 is poor, the quality of the return video stream transmitted back by the UAV to the smart terminal 2 through an image transmission method may also be poor. Correspondingly, the quality of the generated small video may also be poor.

Figure 10:
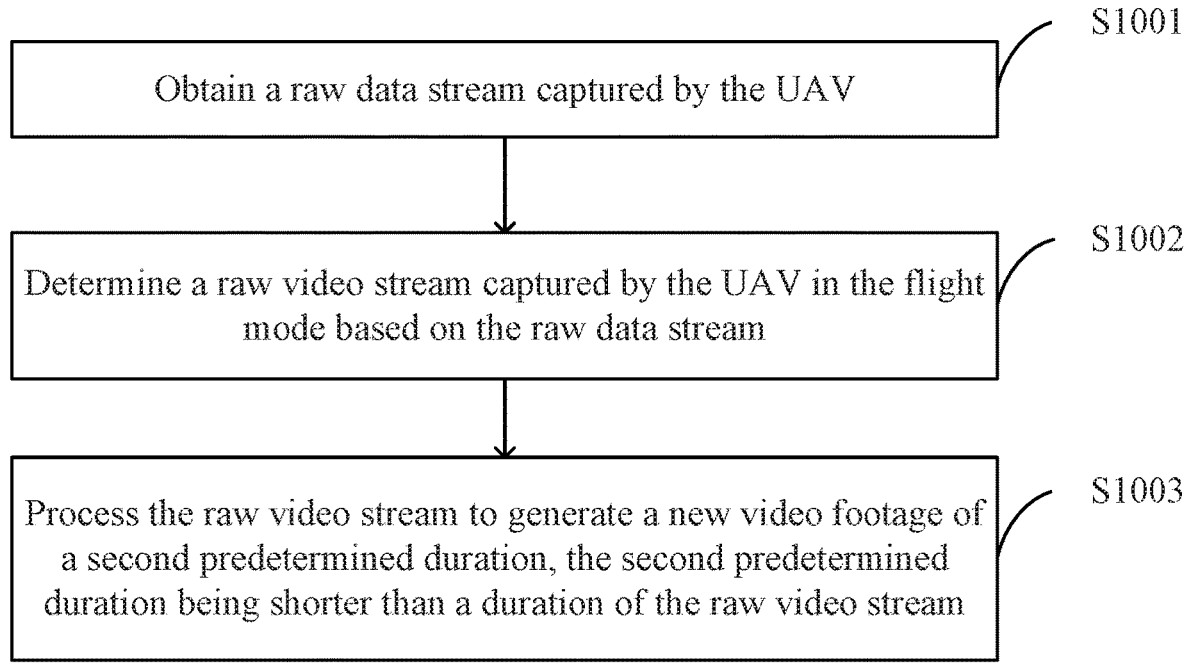
FIG. 10 is a flow chart of an imaging control method at the smart terminal side, according to another example embodiment.

With regard the issue of poor quality of the return video stream, referring to FIG. 10, in the present disclosure, the video footage generating method may also include the following steps:

Step S1001: obtaining a raw data stream captured by the UAV.

In each flight mode, the UAV may store, in real time, the current video data (i.e., the raw data stream) captured by the imaging device, and may compress the raw data stream in real time to generate a return video stream and transmit it back to the smart terminal 2 through an image transmission method, such that the smart terminal 2 can display, in real time, the images currently captured by the UAV. To improve the quality of the generated small video, the smart terminal 2 may obtain the raw data stream stored by the UAV, and generate the small video based on the raw data stream.

In some embodiments, the raw data stream captured by the UAV may be stored in the UAV or a storage unit of the imaging device. In some embodiments, the smart terminal 2 may directly retrieve the raw data stream stored in the storage unit that is captured by the UAV. It should be noted, that step S1001 and step S901 differ in the data transmission methods: in step S901, the UAV transmits the captured video stream to the smart terminal 2 through a wireless communication method. Because the communication distance between the UAV and the smart terminal 2 is far, it is possible that the communication quality between the UAV and the smart terminal 2 is poor; in step S1001, the smart terminal 2 may retrieve the raw data stream from the storage unit through a wired communication method, or under the condition of maintaining relatively good wireless communication quality, the smart terminal 2 may directly retrieve the raw data stream from the storage unit, thereby ensuring that the smart terminal 2 can obtain the raw data stream having images of good quality. In some embodiments, the storage unit may be a component capable of storing data, such as a secure digital ("SD") card or a hard disk or a magnetic disk.

In some embodiments, in the video data stored in the storage unit, the raw data stream may include a corresponding video label. The smart terminal 2 may search and find the corresponding raw data stream based on the label from the storage unit. Specifically, step S1001 may be executed after the UAV satisfies a specified condition. The specified condition may include: the UAV accomplishes a flight in a flight mode. Specifically, after the UAV accomplishes the flight in the flight mode, the smart terminal 2 may directly retrieve the raw data stream captured by the UAV and stored in the storage unit, thereby obtaining a raw data stream having images of good quality, and processing the raw data stream to generate a small video having images of good quality.

Step S1002: determining a raw video stream captured by the UAV in the flight mode based on the raw data stream.

In some embodiments, step S1002 may include: determining the raw video stream captured by the UAV in the flight mode from the raw data stream based on the video stream label corresponding to the flight mode. Through the video label, the raw video stream captured by the UAV in the flight mode may be relatively accurately and quickly obtained from a large amount of video streams, thereby more quickly generating the small video in the flight mode.

Step S1003: processing the raw video stream to generate a new video footage of a second predetermined duration. The second predetermined duration may be shorter than a duration of the raw video stream.

In some embodiments, step S1001, step S1002, and step S1003 may be executed after it is determined that a resolution of the video footage obtained based on the return video stream is lower than a predetermined resolution, thereby obtaining the new video footage having relatively high quality.

In some embodiments, the method may also include: transmitting the new video footage to the remote terminal server, thereby realizing sharing of the small video. In some embodiments, the remote terminal server may be a third-party website, such as video sharing websites Youku™, Tudou™, etc., or social media networks, such as friend circle. In some embodiments, transmitting the video footage to the remote terminal server may be executed after step S1003 is complete, thereby realizing quick sharing of the small video. In some embodiments, prior to transmitting the new video footage to the remote terminal server, the method may include: receiving a sharing instruction input by a user. The sharing instruction may include the corresponding remote terminal server. The video footage may be transmitted to the remote terminal server based on the sharing instruction, thereby realizing flexible sharing of the small video based on the actual needs of the user.

In some embodiments, the smart terminal 2 may simultaneously execute step S1001, step S1002, step S1003, and step S804 and step S901, thereby obtaining two video footages for the user to select, which increases the richness of the selection.

In some embodiments, the method may also include: based on the video footage generated in step S901 and the new video footage generated in step S1003, at least one of the two video footages is transmitted to the remote terminal server. In some embodiments, one of the video footage generated in step S901 and the new video footage generated in step S1003 that has a higher resolution may be transmitted to the remote terminal server. In some embodiments, based on the video footage generated in step S901 and the new video footage generated in step S1003, before at least one of the two video footages is transmitted to the remote terminal server, the method may also include: receiving a sharing instruction input by a user. The sharing instruction may include the remote terminal server and an identification of a video to be shared. The identification of the video to be shared may be a description corresponding to at least one of the video footage generated in step S901 and the new video footage generated in step S1003. The method may also include transmitting one of the video footage generated in step S901 and the new video footage generated in step S1003 to the remote terminal server based on the sharing instruction, thereby realizing flexible sharing of the small video based on the actual needs of the user.

In some embodiments, the second predetermined duration may be set based on actual needs. In some embodiments, the second predetermined duration may be set to be the same as the first predetermined duration.

In some embodiments, the strategy used for processing the raw video stream in step S1003 may be similar to the strategy used for processing the return video stream in step S802, the details of which may refer to the strategy used for processing the return video stream in step S901, which is not repeated here.

Steps of the method that have not been described in great detail can refer to the same or similar steps of the imaging control method described previously, which are not repeated here.

In some embodiments, corresponding to the imaging control methods described above, the present disclosure also provides an imaging control device. The device may be implemented at the UAV 1.

Figure 11:
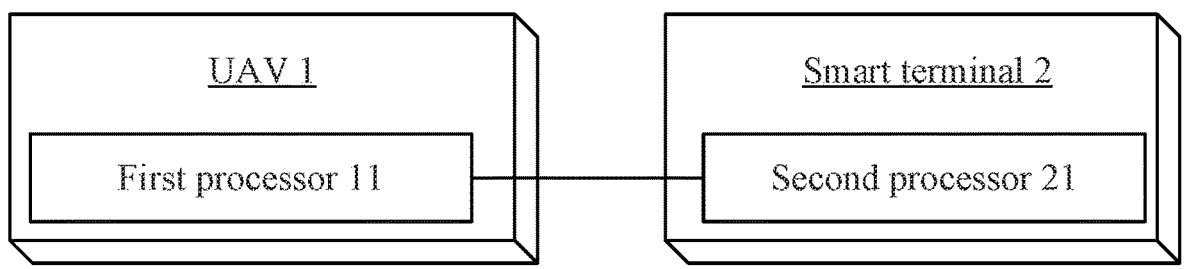
FIG. 11 is a schematic diagram of a structure of an imaging control device, according to an example embodiment.

Referring to FIG. 11, the imaging control device may include a first processor 11. The first processor 11 may be configured to execute steps of the imaging control method described above.

In some embodiments, the first processor 11 may be communicatively connected with the smart terminal 2. Thus, the first processor 11 may receive a starting instruction from the smart terminal 2, and may transmit images captured by the UAV and other data information of the UAV to the smart terminal 2.

In some embodiments, the first processor 11 may be configured as a controller in a dedicated control device, or may be configured as a flight controller of the UAV, or may be configured as a gimbal controller.

Portions of the device that function in the same or similar manner as those described in the above disclosed imaging control methods may refer to the corresponding descriptions of the methods, which are not repeated here.

In some embodiments, corresponding to the imaging control method disclosed herein, the present disclosure provides another imaging control device. The device may be implemented in the smart terminal 2 that has installed with an APP.

Referring to FIG. 11, the imaging control device may include a second processor 21. The second processor 21 may be configured to execute the steps of the above disclosed imaging control methods.

In some embodiments, the second processor 21 may be communicatively connected with a control device of the UAV 1. The control device of the UAV 1 may be realized by a dedicated control device, or may be realized by a flight controller of the UAV, or may be realized by a gimbal controller. The second processor 21 may be configured to transmit the starting instruction to the UAV 1 to instruct the UAV to perform aerial photography. The second processor 21 may also be configured to receive images captured by the UAV or other data information of the UAV.

Portions of the device that function in the same or similar manner as those described in the above disclosed imaging control methods may refer to the corresponding descriptions of the methods, which are not repeated here.

In some embodiments, corresponding to the imaging control methods disclosed herein, the present disclosure provides another imaging control device. The device may be implemented at the UAV 1.

Figure 12:
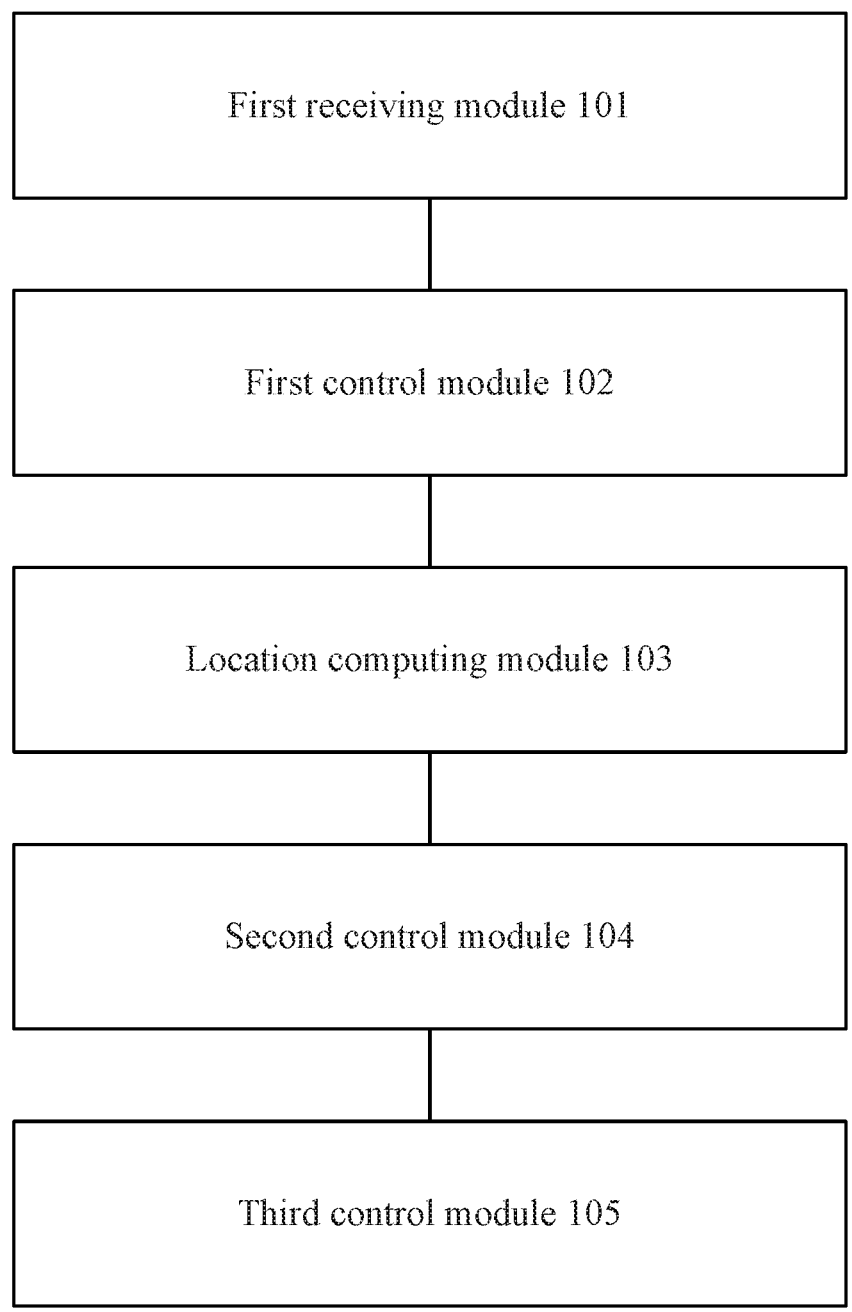
FIG. 12 is a schematic diagram of an imaging control device at the UAV, according to an example embodiment.

Referring to FIG. 12, the device may include:
a first receiving module 101 configured to receive the starting instruction, where the starting instruction includes a flight mode of the UAV;
a first control module 102 configured to control the UAV to autonomously fly based on the flight mode;
a location computing module 103 configured to obtain location information of the target object in the flight mode, and to obtain orientation information of the target object relative to the UAV based on the target object recognized from the image captured by the imaging device;
a second control module 104 configured to control a flight path of the UAV based on the location information and the flight mode;
a third control module 105 configured to control attitude of a gimbal based on the orientation information to render the target object to appear in the image captured by the imaging device.

Figure 13:
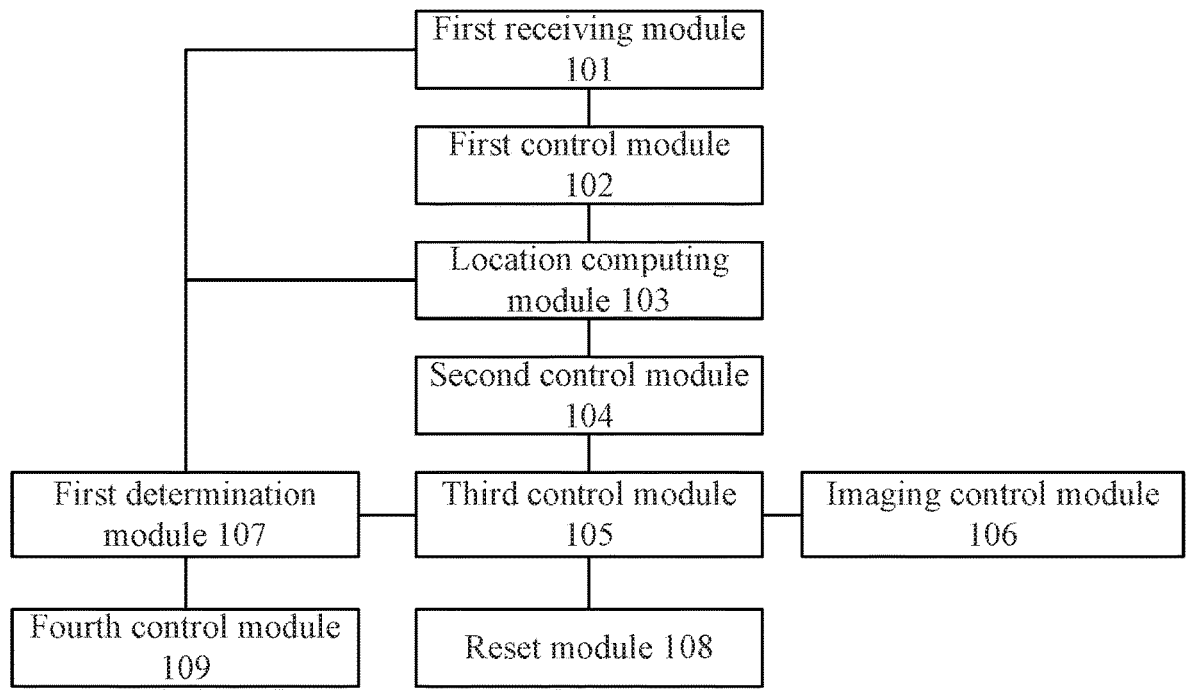
FIG. 13 is a schematic diagram of an imaging control device at the UAV, according to another example embodiment.

In some embodiments, referring to FIG. 13, the device may also include an imaging control module 106 configured to control the imaging device to record videos in the flight mode, and to transmit the video data to the smart terminal 2.

In some embodiments, as shown in FIG. 13, the device may also include a first determination module 107. When the first determination module 107 determines that the location computing module 103 cannot recognize the target object in the image, the third control module 105 may replace the step of controlling the attitude of the gimbal based on the orientation information with the step of controlling the attitude of the gimbal based on the location information.

In some embodiments, controlling the attitude of the gimbal may include: controlling at least one of the pitch angle, the yaw angle, or the roll angle of the gimbal.

In some embodiments, the location computing module 103 may be configured to determine the pitch angle and/or the yaw angle of the gimbal.

In some embodiments, the process for determining the pitch angle and/or the yaw angle of the gimbal may include: determining at least one of the pitch angle or the yaw angle of the gimbal based on an expected display location of a specified location of a background identification to be displayed in the captured image.

In some embodiments, determining at least one of the pitch angle or the yaw angle of the gimbal based on the expected display location of the specified location of the background identification to be displayed in the captured image may include:
obtaining a first total pixel distance of a captured image in a first direction and a pixel distance of the expected display location of the specified location of the background identification to be displayed in the captured image to an edge of the image in the first direction, where the first direction may correspond to the pitch direction or the yaw direction of the gimbal;
determining the pitch angle and/or the yaw angle of the gimbal based on the first total pixel distance, the pixel distance, and the size of the vertical field of view or the horizontal field of view of the imaging device.

In some embodiments, the background identification may include at least one of a ground, a sky, a sea surface, or a building.

In some embodiments, the process of determining the pitch angle and/or the yaw angle of the gimbal may include:
obtaining an elevation angle and/or a horizontal angle of a predetermined imaging location;
determining a deviation angle of the target object relative to a center line of the first direction of the captured image, the first direction corresponding to the pitch direction or the yaw direction of the gimbal;
determining the pitch angle and/or the yaw angle of the gimbal based on the deviation angle and the elevation angle and/or the horizontal angle.

In some embodiments, determining a deviation angle of the target object relative to the center line of the first direction of the captured image may include:
obtaining a first total pixel distance of the captured image in the first direction and a vertical field of view and/or horizontal field of view of the imaging device;
determining a first deviation pixel distance of the target object to the center line of the first direction of the captured image;
determining the deviation angle of the target object relative to the center line of the first direction of the captured image based on the first total pixel distance, the vertical field of view and/or the horizontal field of view, and the first deviation pixel distance.

In some embodiments, controlling the flight path of the UAV based on the location information and the flight mode may include:
determining a distance between the target object and the imaging device;
controlling the flight path of the UAV based on the location information, the flight mode, and the distance between the target object and the imaging device.

In some embodiments, determining the distance between the target object and the imaging device may include:
obtaining an actual height of the target object and a first total pixel distance of the captured image in the first direction;
obtaining a pixel distance corresponding to the actual height of the target object to be displayed in the first direction of the captured image, where the first direction corresponds to the pitch direction of the gimbal;
determining a distance between the target object and the imaging device based on the actual height of the target object, the first total pixel distance, and the pixel distance corresponding to the actual height of the target object in the first direction of the captured image.

In some embodiments, the location computing module 103 may be configured to obtain the elevation angle of the predetermined imaging location, the horizontal field of view of the imaging device, and a second total pixel distance of the captured image in a second direction, after determining the distance between the target object and the imaging device, wherein the second direction may correspond to the yaw direction of the gimbal; to determine a second pixel deviation distance of the target object relative to a center line of the second direction of the captured image; to determine a moving distance in the pitch direction of the gimbal based on the second pixel deviation distance, the elevation angle, the horizontal field of view, the second total pixel distance, and the distance between the target object and the imaging device. The third control module 105 may be configured to control the attitude of the gimbal based on the moving distance in the pitch direction of the gimbal.

In some embodiments, the location computing module 103 may be configured to obtain a horizontal field of view of the imaging device, a second total pixel distance of the captured image in a second direction, where the second direction corresponds to the yaw direction of the gimbal; to determine a second pixel deviation distance of the target object to a center line of the second direction of the captured image; to determine a yaw angle of the gimbal based on the second total pixel distance, the horizontal field of view, and the second pixel deviation distance. The third control module 105 may be configured to control the attitude of the gimbal based on the yaw angle.

In some embodiments, the gimbal and the UAV may be fixed relative to one another in a heading axis. The third control module 105 may be configured to control the pitch angle and/or the roll angle of the gimbal, and to control a heading angle of the UAV to control the yaw angle of the gimbal.

In some embodiments, the flight mode may include at least one of the following: a slant line mode, a circling mode, a spiral mode, a roaring mode, or a comet circling mode. Each flight mode may include a corresponding flight strategy. The flight strategy may be configured to instruct the flight of the UAV.

In some embodiments, the flight strategy corresponding to the slant line mode may include: controlling, by the second control module 104, based on the location information, the UAV to first fly along a horizontal plane and then to fly along a plane forming a certain angle with the horizontal plane.

In some embodiments, the second control module 104 controlling the UAV to fly along the horizontal plane and then to fly along the plane forming the certain angle with the horizontal plane may include: controlling the UAV to fly along the horizontal plane; when it is determined that an angle between a line connecting the lowest point of the target object and a center of the UAV and a line connecting the highest point of the target object and the center of the UAV is smaller than a predetermined multiple of the field of view of the imaging device, then based on the location information, controlling the UAV to fly along the plane forming the certain angle with the horizontal plane. The predetermined multiple may be <1.

In some embodiments, the second control module 104 controlling the UAV to fly along the plane forming the certain angle with the horizontal plane may include: controlling the UAV to fly along a line connecting the target object and the UAV in a direction away from the target object.

In some embodiments, the flight strategy corresponding to the slant line mode may include: controlling, by the second control module 104, the UAV to fly in an S shape curve away from the target object based on the location information.

In some embodiments, the flight strategy corresponding to the circling mode may include: based on the location information, controlling, by the second control module 104, the UAV to fly circling around the target object based on a specified distance.

In some embodiments, the specified distance may be a default distance, or the specified distance may be distance information input by the user, or the specified distance may be a distance between the UAV and the target object at the current time instance.

In some embodiments, the flight strategy corresponding to the spiral mode may include: based on the location information, controlling, by the second control module 104, the UAV to fly circling around the target object in a flight path having a shape of a Fibonacci spiral, an equal ratio spiral, an equiangular spiral, or an Archimedean spiral.

In some embodiments, the flight strategy corresponding to the spiral mode may also include: based on the location information, while controlling, by the second control module 104, the UAV to fly circling around the target object in a flight path having a shape of a Fibonacci spiral, an equal ratio spiral, an equiangular spiral, or an Archimedean spiral, in the meantime, also controlling, by the second control module 104, the UAV to ascend or descend perpendicular to the ground based on a predetermined speed.

In some embodiments, the flight strategy corresponding to the roaring mode may include: based on the location information, controlling, by the second control module 104, the UAV to fly slantly according to a predetermined angle to a first specified location relative to the target object, and then controlling the UAV to ascend perpendicular to the ground.

In some embodiments, the flight strategy corresponding to the comet circling mode may include: based on the location information, controlling, by the second control module 104, the UAV to fly to a second specified location in a direction moving closer to the target object, and after circling around the target object starting from the second specified location, fly away from the target object.

In some embodiments, each flight mode may include at least one of a corresponding flight path or a flight velocity.

In some embodiments, obtaining by the location computing module 103 the location information may include:

obtaining an information set including at least two groups of imaging information, the imaging information may include: imaging location information and imaging angle information when the target object is captured; and determining the location information of the target object based on at least two groups of imaging information selected from the information set, where locations corresponding to imaging location information included in each selected group of imaging information may be different.

In some embodiments, determining the location information of the target object based on at least two groups of imaging information selected from the information set may include:

determining location initial estimation information of at least two target objects based on at least three groups of imaging information; and determining location information of each target object based on the location initial estimation information.

In some embodiments, the imaging location information may be the positioning information of the UAV.

In some embodiments, obtaining, by the location computing module 103, the location information of the target object may include: obtaining positioning information of the smart terminal 2. The smart terminal 2 may be a terminal communicating with the UAV. The location information may be the positioning information.

In some embodiments, obtaining, by the location computing module 103, the orientation information of the target object relative to the UAV based on the images captured by the imaging device may include: obtaining feature information of the target object to be tracked; recognizing the target object from the captured images based on image recognition technology and based on the feature information, and obtaining the orientation information of the target object relative to the UAV.

In some embodiments, referring to FIG. 13, the device may also include a reset module 108 configured to control the UAV to move to a reset location after the second control module 104 controls the flight path of the UAV based on the location information and the flight mode.

In some embodiments, referring to FIG. 13, the device may also include a fourth control module 109 configured to control at least one of the flight of the UAV or the attitude of the gimbal based on a joystick operation signal, after the first determination module 107 determines that the first receiving module 101 receives the joystick operation signal transmitted from an external device.

In some embodiments, the joystick operation signal may include at least one of a signal controlling the UAV to ascend or descend perpendicular to the ground, a signal controlling the UAV to move away or closer to the target object, a signal for controlling the flight velocity of the UAV, a signal for controlling the yaw angle of the gimbal, or a signal for controlling the rotation of the aircraft body of the UAV.

Portions of the device that function in the same or similar manner as those described in the above disclosed imaging control methods may refer to the corresponding descriptions of the methods, which are not repeated here.

In some embodiments, corresponding to the imaging control methods disclosed herein, the present disclosure also provides another imaging control device. The device may be implemented in the smart terminal 2 installed with an APP.

Figure 14:
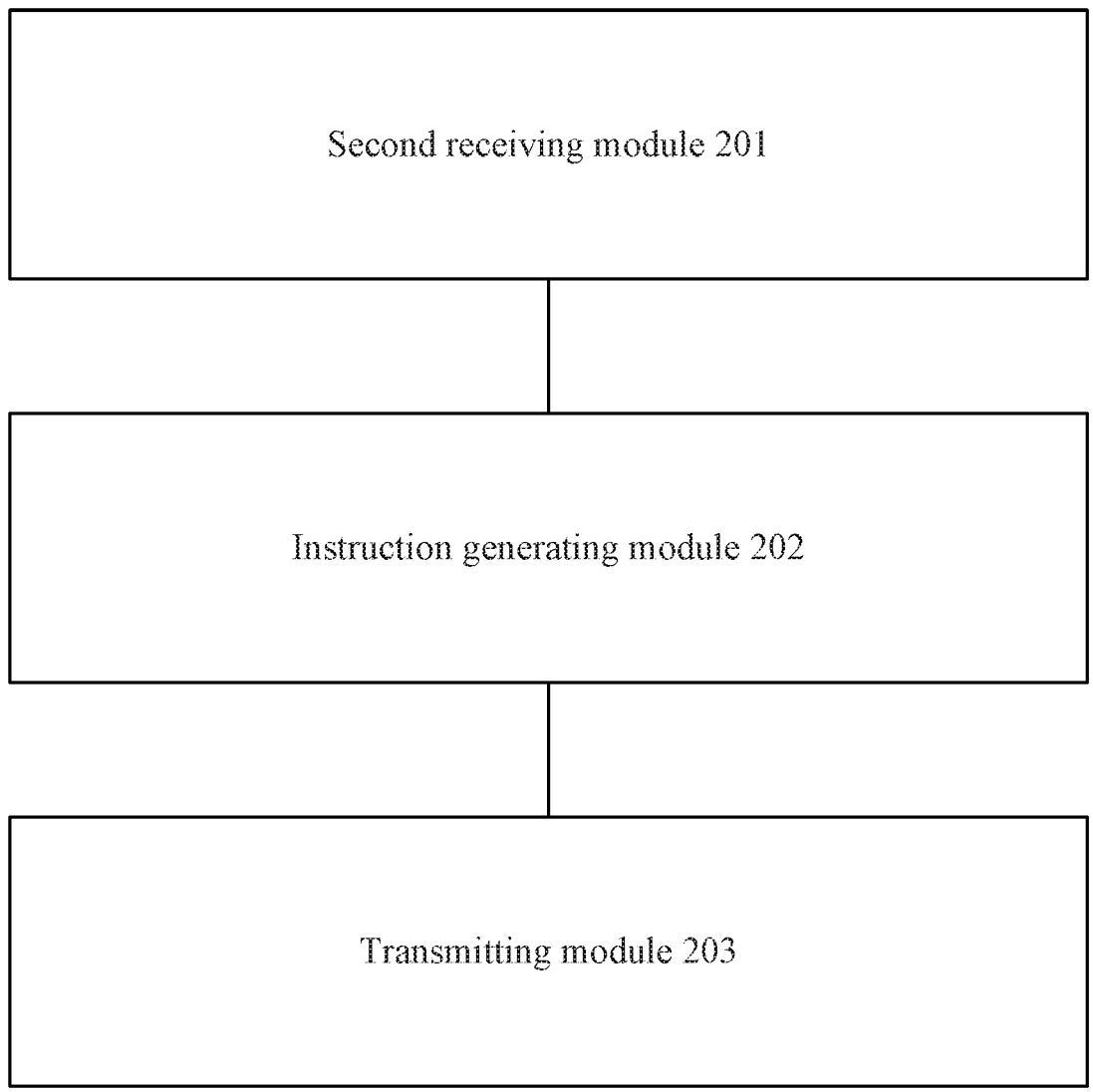
FIG. 14 is a schematic diagram of an imaging control device at the smart terminal side, according to an example embodiment.

Referring to FIG. 14, the device may include:
a second receiving module 201 configured to receive a user instruction;
an instruction generating module 202 configured to generate a starting instruction based on the user instruction. The starting instruction may include a flight mode of the UAV. The starting instruction may be configured to trigger the UAV to autonomously fly based on the flight mode;
a transmitting module 203 configured to transmit the starting instruction to the UAV, where the starting instruction is configured to trigger the UAV to autonomously fly based on the flight mode.

After the transmitting module 203 transmits the starting instruction to the UAV, the second receiving module 201 may receive and store a return video stream transmitted back by the UAV in the flight mode.

In some embodiments, the user instruction may include: determining a target object to be tracked.

In some embodiments, the method may include: recognizing feature information of the target object to be tracked in the currently displayed image, the feature information being a predetermined location or a predetermined size of the target object to be displayed in the captured image.

In some embodiments, the user instruction may include: an expected display location of the specified location of the background identification to be displayed in the captured image. The background identification may include at least one of a ground, a sky, a sea surface, or a building.

In some embodiments, the use instruction may include: an elevation angle or a horizontal angle of an imaging location.

In some embodiments, the user instruction may include: at least one of the flight distance or the flight velocity of the UAV.

In some embodiments, the flight mode may be a default flight mode; or the user instruction includes a mode selection instruction. The mode selection instruction includes a flight mode for instructing the flight of the UAV.

In some embodiments, the flight mode may include at least one of the following: a slant line mode, a circling mode, a spiral mode, a roaring mode, or a comet circling mode. Each flight mode may include a corresponding flight strategy. The flight strategy may be configured to instruct the flight of the UAV.

Figure 15:
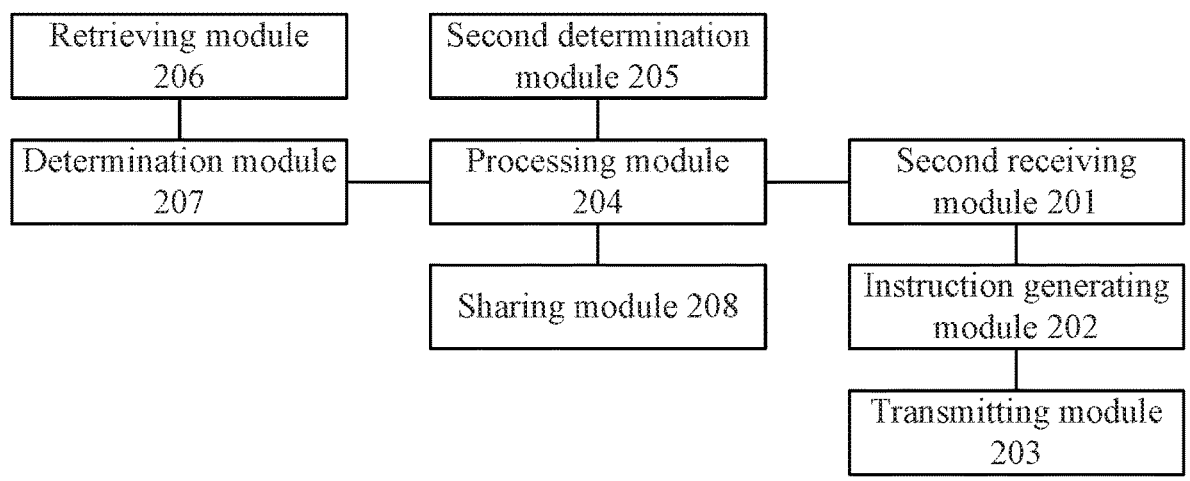
FIG. 15 is a schematic diagram of an imaging control device at the smart terminal side, according to another example embodiment.

In some embodiments, referring to FIG. 15, the device may also include a processing module 204 configured to process the return video stream to generate a video footage of a first predetermined duration. The first predetermined duration may be shorter than the duration of the return video stream.

In some embodiments, referring to FIG. 15, the device may also include a second determination module 105. The step of processing, by the processing module 204, the return video stream and generating the video footage may be executed after the second determination module 205 determines that the UAV satisfies a specified condition.

In some embodiments, the specified condition may include: the second determination module 205 determines that the UAV has accomplished the flight in the flight mode.

In some embodiments, processing, by the processing module 204, the return video stream to generate the video footage of the first predetermined duration may include: processing the return video stream with frame extraction to generate the video footage of the first predetermined duration.

In some embodiments, processing, by the second processing module 204, the return video stream with frame extraction to generate the video footage of the first predetermined duration may include: processing the return video stream with frame extraction based on at least one of the flight mode, a flight velocity, or a flight direction of the UAV, to generate the video footage of the first predetermined duration.

In some embodiments, processing, by the second processing module 204, the return video stream with frame extraction to generate the video footage of the first predetermined duration may include:
processing the return video stream with frame extraction based on a duration of the return video stream and a number of frames of the return video stream, to generate the video footage of the first predetermined duration.

In some embodiments, processing, by the processing module 204, the return video stream with frame extraction based on the duration of the return video stream and the number of frames of the return video stream, to generate the video footage of the first predetermined duration may include: dividing the return video stream into multiple segments to obtain multiple segments of the return video stream; processing a portion of the multiple segments of the return video stream with frame extraction to obtain frame extraction images of the corresponding segments of the return video stream; and generating the video footage of the first predetermined duration based on another portion of the return video stream and the frame extraction images of the corresponding segments of the return video stream.

In some embodiments, dividing, by the processing module 204, the return video stream into multiple segments may include: dividing the return video stream into at least three segments based on a sequential order in the imaging time. Processing, by the processing module 204, a portion of the multiple segments of the return video stream with frame extraction to obtain frame extraction images of the corresponding segments of the return video stream may include: processing a segment of the return video stream whose imaging time is located at a middle time segment among the at least three segments of the return video stream with frame extraction, to obtain the frame extraction images corresponding to this segment of the return video stream.

In some embodiments, processing, by the processing module 204, a portion of the multiple segments of the return video stream with frame extraction to obtain frame extraction images of the corresponding segments of the return video stream may include: processing a corresponding segment of the return video stream with frame extraction based on a predetermined frame extraction speed, to obtain the frame extraction images of the corresponding segment of the return video stream.

In some embodiments, referring to FIG. 15, the device may also include a retrieving module 206 and a determination module 207. The retrieving module 206 may be configured to obtain a raw data stream captured by the UAV. The determination module 207 may be configured to determine, based on the raw data stream, a raw video stream captured by the UAV in the flight mode. The processing module 204 may be configured to process the raw video stream to generate a new video footage of a second predetermined duration. The second predetermined duration may be shorter than the duration of the return video stream.

In some embodiments, determining, by the determination module 207, based on the raw data stream, the raw video stream captured by the UAV in the flight mode may include: determining the raw video stream captured by the UAV in the flight mode from the raw data stream based on a video stream label corresponding to the flight mode.

In some embodiments, the step of obtaining, by the retrieving module 206, the raw data stream captured by the UAV may be executed after the second determination module 205 determines that the resolution of the video footage obtained based on the return video stream is lower than the predetermined resolution.

In some embodiments, referring to FIG. 15, the device may also include a sharing module 208 configured to transmit at least one of the video footage and the new video footage to the remote terminal server.

In some embodiments, prior to the sharing module 208 transmits at least one of the video footage and the new video footage to the remote terminal server, the second receiving module 201 may receive a sharing instruction input by the user. The sharing instruction may include the remote terminal server and an identification of the video to be shared. The identification of the video to be shared may be an identification corresponding to at least one of the video footage and the new video footage. The sharing module 208 may transmit at least one of the video footage and the new video footage to the remote terminal server based on the sharing instruction.

Portions of the device that function in the same or similar manner as those described in the above disclosed imaging control methods may refer to the corresponding descriptions of the methods, which are not repeated here.

In some embodiments, the present disclosure provides a non-transitory computer-readable storage medium. The computer-readable storage medium may be configured to store program instructions, which when executed by a processor, cause the processor to perform the methods (e.g., the imaging control methods) disclosed herein.

In the present description, descriptions of reference terms such as "an embodiment," "some embodiments," "illustrative embodiment," "example," "specific example," or "some examples," mean that characteristics, structures, materials, or features described in relation to the embodiment or example are included in at least one embodiment or example of the present disclosure. In the present description, illustrative expression of the above terms does not necessarily mean the same embodiment or example. Further, specific characteristics, structures, materials, or features may be combined in one or multiple embodiments or examples in a suitable manner.

A process or method shown in a flow chart or described in any other form may represent one or more module, segments, or parts of computer-executable codes for realizing specific logical functions or for executing specific steps. Other implementations of the disclosed methods or functions may also be included in the present disclosure. Steps of the processes do not necessarily have to be executed in the order shown in the flow chart or as described. Other orders or sequences, such as simultaneous execution or execution in reverse order may be adopted based on the functions to be realized. A person having ordinary skills in the art can understand that the present disclosure is not limited to the illustrative order of the steps.

The logic or steps shown in the flow chart or otherwise described in the specification may be regarded as representation of a list of computer-executable codes for realizing certain logic functions. The computer-executable codes may be embedded or encoded in a computer-readable storage medium. The computer-readable storage medium may be used by code-executing system, apparatus, or device (e.g., a computer-based system, a system having a processing device or a processor, or other systems that can read and execute codes from a code-executing system, apparatus, or device). The computer-readable medium may be used in combination with the code-executing system, apparatus, or device. In the present disclosure, the term "computer-readable medium" refers to a non-transitory device that may include, store, communicate, broadcast, or transmit computer program code for the code-executing system, apparatus, or device to execute, or may be any device that may be used with the code-executing system, apparatus, or device. The non-transitory computer-readable storage medium may include one or more of: an electrical connector having one or more wiring layouts (e.g., electronic device, a portable computer disk case (e.g., magnetic device), a random access memory ("RAM"), a read-only memory ("ROM"), an Electrically Programmable read only memory ("EPROM" or a flash memory), an optical device, or a Compact Disc-ROM ("CD-ROM"). In some embodiments, the computer-readable medium may include a paper or other suitable medium printed with a computer program. The paper or other suitable medium may be optically scanned, edited, interpreted, or processed using other methods to obtain the computer program electronically, which may be stored in a computer storage medium.

A person having ordinary skills in the art can appreciate that part or all of the above disclosed methods and processes may be implemented using related electrical hardware, computer software, firmware, or a combination thereof. In the above embodiments, multiple steps or methods may be realized using software or firmware stored in the computer-readable storage medium and executable by a suitable code-executing system. For example, if the disclosed methods and processes are implemented using hardware, the hardware may include at least one of the following: a discrete logic circuit having a logic gate circuit that may be configured to perform logic functions for digital signals, an application specific integrated circuit having suitable combinations of logic gate circuits, a programmable gate array ("PGA"), a field programmable gate array ("FPGA"), etc.

A person having ordinary skills in the art can appreciate that some or all of the steps of the above disclosed methods may be implemented using programs instructing related hardware. The program may be stored in a computer-readable storage medium. When the program is executed, one of the steps of the disclosed methods or a combination thereof may be performed.

Various functional units or components may be integrated in a single processing unit, or may exist as separate physical units or components. In some embodiments, two or more units or components may be integrated in a single unit or component. The integrated unit may be realized using hardware, software functional modules, or a combination of hardware and software functional modules. If the integrated units are realized as software functional units and sold or used as independent products, the integrated units may be stored in a computer-readable storage medium.

The storage medium mentioned above is a read-only memory, a magnetic disk, or an optical disc, etc. Although various embodiments are illustrated and described, it can be understood that these embodiments are illustrative only, and cannot be understood as limiting the scope of the present disclosure. A person having ordinary skills in the art can change, modify, replace, or vary these embodiments within the scope of the present disclosure.

What is claimed is:

1. An imaging control method, comprising:
    receiving a starting instruction comprising a flight mode of an unmanned aerial vehicle ("UAV");
    controlling the UAV to fly autonomously based on the flight mode;
    obtaining, in the flight mode, location information of a target object;
    controlling a flight path of the UAV based on the location information and the flight mode;
    controlling an attitude of the gimbal to render the target object to appear in an image captured by an imaging device carried by a gimbal mounted on the UAV, including:
    in response to the target object being recognized in the captured image, obtaining orientation information of the target object relative to the UAV in the captured image and controlling the attitude of the gimbal based on the orientation information of the target object; and
    in response to the target object not being recognized in the captured image, controlling the attitude of the gimbal based on the location information of the target object; and
    controlling the imaging device to record a video in the flight mode, and to transmit video data to a terminal,
    wherein the flight mode comprises at least one flight mode selected from the group consisting of: a slant line mode, a circling mode, a spiral mode, a roaring mode, and a comet circling mode, and wherein each flight mode comprises a corresponding flight strategy configured to instruct a flight of the UAV,
    wherein a flight strategy corresponding to the slant line mode comprises:
        controlling, based on the location information, the UAV to first fly along a horizontal plane and then to fly along a plane forming a certain angle with the horizontal plane; and
    controlling the UAV to fly in an S shape curve away from the target object based on the location information,
    wherein a flight strategy corresponding to the circling mode comprises: controlling, based on the location information, the UAV to fly circling around the target object based on a specified distance,
    wherein a flight strategy corresponding to the spiral mode comprises: controlling, based on the location information, the UAV to fly circling around the target object in a flight path having a shape of a Fibonacci spiral, an equal ratio spiral, an equiangular spiral, or an Archimedean spiral,
    wherein a flight strategy corresponding to the roaring mode comprises: controlling, based on the location information, the UAV to fly slantly according to a predetermined angle to a first specified location relative to the target object, and then controlling the UAV to ascend perpendicular to the ground,
    wherein a flight strategy corresponding to the comet circling mode comprises: controlling, based on the location information, the UAV to fly to a second specified location in a direction moving closer to the target object, and after circling around the target object starting from the second specified location, fly away from the target object.

2. The imaging control method of claim 1, wherein controlling the UAV to first fly along the horizontal plane and then to fly along the plane forming the certain angle with the horizontal plane comprises:
    controlling the UAV to fly along the horizontal plane; and
    when it is determined that an angle between a line connecting a lowest point of the target object and a center of the UAV and a line connecting a highest point of the target object and the center of the UAV is smaller than a predetermined multiple of a field of view of the imaging device, then based on the location information, controlling the UAV to fly along the plane forming the certain angle with the horizontal plane,
    wherein the predetermined multiple may be smaller than 1.

3. The imaging control method of claim 2, wherein controlling the UAV to fly along the plane forming the certain angle with the horizontal plane comprises:
    controlling the UAV to fly along a line connecting the target object and the UAV in a direction away from the target object.

4. The imaging control method of claim 1, wherein the specified distance is a default distance, or the specified distance is distance information input by the user, or the specified distance is a distance between the UAV and the target object at a current time instance.

5. The imaging control method of claim 1,
    wherein a flight strategy corresponding to the spiral mode comprises: while controlling, based on the location information, the UAV to fly circling around the target object in the flight path having the shape of the Fibonacci spiral, the equal ratio spiral, the equiangular spiral, or the Archimedean spiral, also controlling the UAV to ascend or descend perpendicular to the ground based on a predetermined speed.

6. The imaging control method of claim 1, wherein each flight mode comprises at least one of a corresponding flight distance or a flight velocity.

7. An imaging control device, comprising:
a memory configured to store computer-executable instructions; and
a processor configured to retrieve and execute the computer-executable instructions to perform a method comprising:
  receiving a starting instruction comprising a flight mode of an unmanned aerial vehicle ("UAV");
  controlling the UAV to fly autonomously based on the flight mode;
  obtaining, in the flight mode, location information of a target object;
  controlling a flight path of the UAV based on the location information and the flight mode;
  controlling an attitude of the gimbal to render the target object to appear in an image captured by an imaging device carried by a gimbal mounted on the UAV, including:
    in response to the target object being recognized in the captured image, obtaining orientation information of the target object relative to the UAV in the captured image and controlling the attitude of the gimbal based on the orientation information of the target object; and
    in response to the target object not being recognized in the captured image, controlling the attitude of the gimbal based on the location information of the target object; and
  controlling the imaging device to record a video in the flight mode, and to transmit video data to a terminal,
  wherein the flight mode comprises at least one flight mode selected from the group consisting of: a slant line mode, a circling mode, a spiral mode, a roaring mode, and a comet circling mode, and wherein each flight mode comprises a corresponding flight strategy configured to instruct a flight of the UAV,
  wherein a flight strategy corresponding to the slant line mode comprises:
    controlling, based on the location information, the UAV to first fly along a horizontal plane and then to fly along a plane forming a certain angle with the horizontal plane; and
    controlling the UAV to fly in an S shape curve away from the target object based on the location information,
  wherein a flight strategy corresponding to the circling mode comprises: controlling, based on the location information, the UAV to fly circling around the target object based on a specified distance,
  wherein a flight strategy corresponding to the spiral mode comprises: controlling, based on the location information, the UAV to fly circling around the target object in a flight path having a shape of a Fibonacci spiral, an equal ratio spiral, an equiangular spiral, or an Archimedean spiral,
  wherein a flight strategy corresponding to the roaring mode comprises: controlling, based on the location information, the UAV to fly slantly according to a predetermined angle to a first specified location relative to the target object, and then controlling the UAV to ascend perpendicular to the ground,
  wherein a flight strategy corresponding to the comet circling mode comprises: controlling, based on the location information, the UAV to fly to a second specified location in a direction moving closer to the target object, and after circling around the target object starting from the second specified location, fly away from the target object.

* * * * *